United States Patent [19]
Chang et al.

[11] 4,417,321
[45] Nov. 22, 1983

[54] QUALIFYING AND SORTING FILE RECORD DATA

[75] Inventors: Philip Y. Chang; Virginia M. Hoffman, both of Austin, Tex.

[73] Assignee: International Business Machines Corp., Armonk, N.Y.

[21] Appl. No.: 264,959

[22] Filed: May 18, 1981

[51] Int. Cl.³ .............................................. G06F 7/24
[52] U.S. Cl. .................................... 364/900; 364/200
[58] Field of Search ... 364/200 MS File, 900 MS File

[56] References Cited

U.S. PATENT DOCUMENTS

| | | | |
|---|---|---|---|
| 3,964,028 | 6/1976 | Belady et al. | 364/200 |
| 4,031,520 | 6/1977 | Rohner | 364/900 |
| 4,080,651 | 3/1978 | Cronshaw et al. | 364/200 |
| 4,080,652 | 3/1978 | Cronshaw et al. | 364/200 |
| 4,101,968 | 7/1978 | Florence | 364/900 |
| 4,126,893 | 11/1978 | Cronshaw et al. | 364/200 |

*Primary Examiner*—Felix D. Gruber
*Assistant Examiner*—D. Rutherford
*Attorney, Agent, or Firm*—Harold E. Meier

[57] ABSTRACT

Record data on a disk file is sorted in a text/data processor by means of an algorithm that transfers such records on the basis of rank to a sort buffer on the basis of qualifying criteria. Each qualified file record is compared with the lowest ranked record previously transferred and located in the sort buffer. When a higher ranked record is identified it is transferred into the buffer at a location based on qualification. Lower ranked records are deleted from the sort buffer if space does not permit the storing of such records within the space available. When the sort buffer has been loaded with the highest ranked records remaining in the disk file without overflowing the buffer is unloaded to an output device. The sort program recycles through a subsequent pass again transferring the highest ranked remaining records into the sort buffer. To minimize recycle time, a presort algorithm is run to set record identifying bits in a bit map section of the sort buffer. Each time the contents of the sort buffer is output the record identifying bits for the records in the sort buffer are reset to a second state. The second state of a record identifying bit indicates that that record will not be considered for future passes through the sort routine.

9 Claims, 8 Drawing Figures

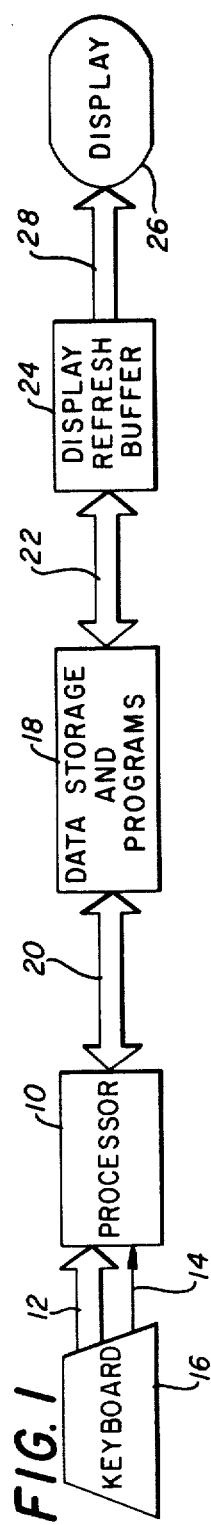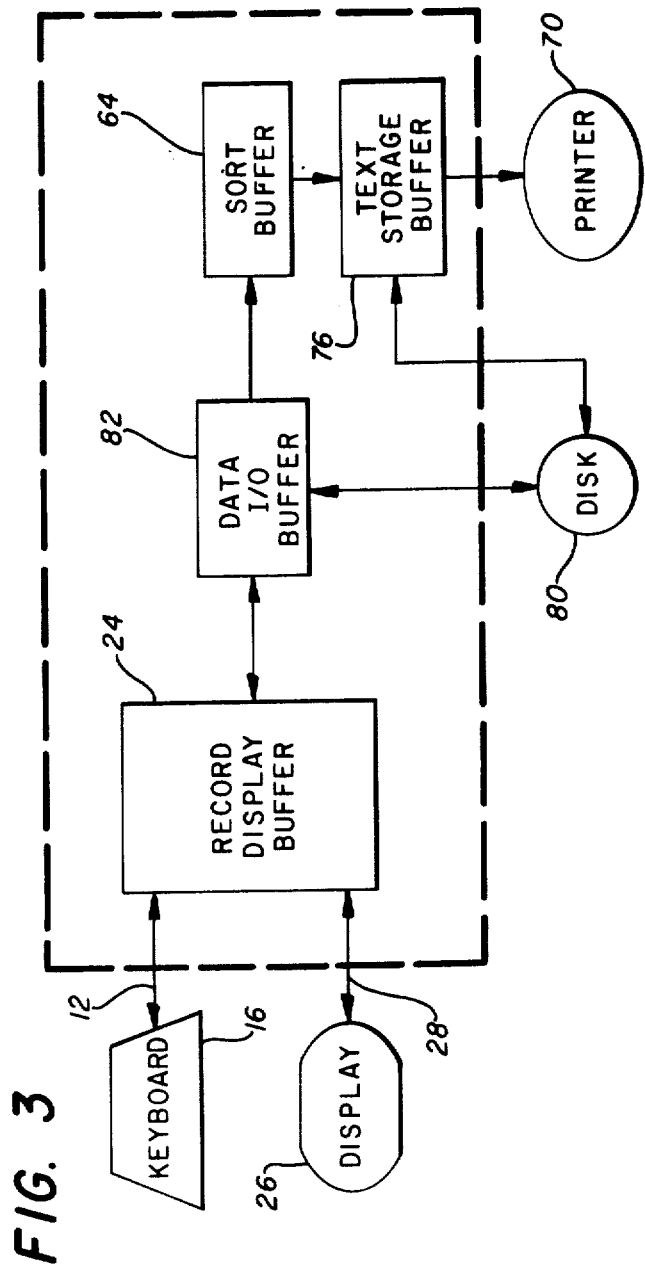

QUALIFYING AND SORTING FILE RECORD DATA

TECHNICAL FIELD

This invention relates to file record data handling in a text/data processing system, and more particularly to file record data sorting in a limited memory environment.

BACKGROUND ART

Office machines for processing text data to produce hard copies are being utilized with increasing frequency for data processing. Such text processing machines are physically structured to include all the necessary elements for data processing including a display screen for presenting to an operator a visual presentation of record data as it will appear on hard copy or be utilized by an output device. Typically, text processing machines incorporate a conventional typewriter keyboard with additional control keys for operator interface with the system controls. For data processing, operator instruction are input through the keyboard and displayed on a screen in a manner similar to the use of such machines for text processing. The display is segmented to allow data formatting instructions to be presented to the operator along with a visual presentation of the data records being processed. Thus, the display not only provides a visual presentation to the operator of the record data being processed, but also provides prompting instructions to allow interface between the text processing machine and the data operator.

Text processing machines on which data processing is carried out include electronic hardware programmed to evaluate operator keystrokes and to control the display. This electronic hardware includes memory for storing file format information and instruction data for future use for processing the file records for subsequent utilization or preparation of hard copy. Responding to the keystrokes of an operator are system controls including programmed computers which prepare the display screen for displaying to the operator file record data. Ease of operation of the machine for the operator is in large part determined by the electronics and associated computers and programs therefor.

Data processing on a text processing machine is achievable by utilization of algorithms with the machine's computers and memory. There are, however, several differences between the processing of text data and record data in a text processing machine. Typically, text is stored in an unstructured, but formatted, format while file records are stored in a structured, but unformatted manner. Text data is formatted in that it includes tabs, carrier returns, etc. Due to the fact that a data file can be fairly large, structuring of the included data permits rapid access to any particular portion. However, this requires programming to achieve this rapid access. To assist an operator in the accessing of file record data, the system display screen is segmented into virtual displays or frames that includes grids to be filled in by an operator for processing of the file data. Through keying, an operator can then cause the stored record data to be qualified for keying "search" criteria.

File record data processing in text processing machines usually utilizes storage of the file record data on a disk. In the past, sorting of the data on the disk was carried out externally, that is, data was transferred from one disk to a second disk in a sort operation or sorting was completed in internal memory. With some earlier file record data processing in a text processing machine, a disk access is needed for the sorting of each record and therefore processing is too cumbersome and time consuming.

Sorting of data is one of the most utilized functions of a text processing machine as a data processor and it thus becomes important to provide efficiency and ease of operator interface of the sorting function.

DISCLOSURE OF THE INVENTION

According to the present invention, data sorting is achieved by use of a sort buffer for temporarily storing qualified file records. Typically, the sort buffer may be a random access memory having, for example, 40 K-bytes of storage. Only qualified records are stored in the sort buffer after being qualified on the basis of one or more search fields. The process of the present invention minimizes the need for a large amount of memory space sufficient to store an entire file, or as an altenative, to use a disk work space to store intermediate results.

To provide file data sorting on the basis of qualifying fields, file data (for example, as stored on the disk) is sequentially loaded into a sort buffer based on specified qualifications and sort criteria. The file data is transferred from the disk to the sort buffer until the buffer cannot accept the next qualified record. However, the file data in the sort buffer is not utilized at this time but instead, the remainder of the file is read and evaluated for comparison against file data previously transferred to the sort buffer. During this reading operation, records of a higher rank replace records of a lower ranking previously transferred to the sort buffer. Upon completion of a reading of all the file data, a register is set to identify the lowest ranked record in the sort buffer and the contents of the buffer are stored or printed. The buffer is cleared for accepting additional records.

The above operation is repeated beginning with the lowest ranked record in the previous operation and continuing until the sorting of the record data file is complete. That is, for each pass the sort buffer is loaded with the best available record file data and the contents are stored or printed. The operation resumes at the lowest qualified file previously transferred to the buffer.

In addition to removing the requirement for disk work space, the record data file process of the present invention enables the utilization of different size sort buffers. Where high speed sorting is required a sort buffer with greater storage space will provide such faster sorting. The larger the sort buffer, the fewer passes that would be required through a file to sort each record on a selected qualification criteria. Thus, a large buffer enables fast sorting and a buffer of more restricted space will provide corresponding slower sorting. An operator of a text processing machine has some control over the speed of sorting by utilization of extra sort buffer space with the process of the present invention.

In accordance with the present invention, file record sorting is enhanced by providing a dedicated portion of a sort buffer for bit mapping, that is, the setting of a record identifying bit for each record in a file. The size of the section of the sort buffer set aside for bit mapping in terms of numbers of bits is equal to the number of records in the file under an average condition.

In operation of the bit mapping process, a record identifying bit is set for each record in the file and the files are sorted on the basis of ranking into the sort buffer. The files are sorted on the basis that highest ranked records are first transferred to the sort buffer and located above lower ranked records. When the sort buffer is full and its content output for storing or printing, each record identifying bit for a record that has been transferred to the sort buffer is reset to indicate that the record has been sorted. For subsequent cycles through the sorting process, only those records with the identifying bit set will be sorted using the record ranking for selection. Thus, subsequent sorting is only for the records having record identifying bits that are set in the bit map section of the sort buffer. On each subsequent reading of records from the file, since the qualification operation has already been performed, only sorting is required.

If there are more records in a file than the number of record identifying bits in the bit map, then the remainder of the records are represented by one bit in an overflow portion. In this situation, each of the record identifying bits that represent only one record are treated as previously described. For the overflow bit, a register is set for all remaining qualified records to be identified by one bit and on each pass these records are sorted on the basis of ranking. Thus, on each sort pass which transfers records from a file to the sort buffer, records identified by the overflow bit are sorted by ranking.

BRIEF DESCRIPTION OF THE DRAWINGS

A more complete understanding of the invention and its advantages will be apparent from the specification and claims and from the accompanying drawings illustrative of the invention.

Referring to the drawings:

FIG. 1 is a basic block diagram of a text/data processing system including a keyboard, processor, memory storage and a display screen for visual presentation to an operator of text/data and operating or prompting instructions;

FIG. 3 is a detail showing the formatting of the storage of the system of FIG. 1 as structured for data processing;

DETAILED DESCRIPTION

Figure 2:
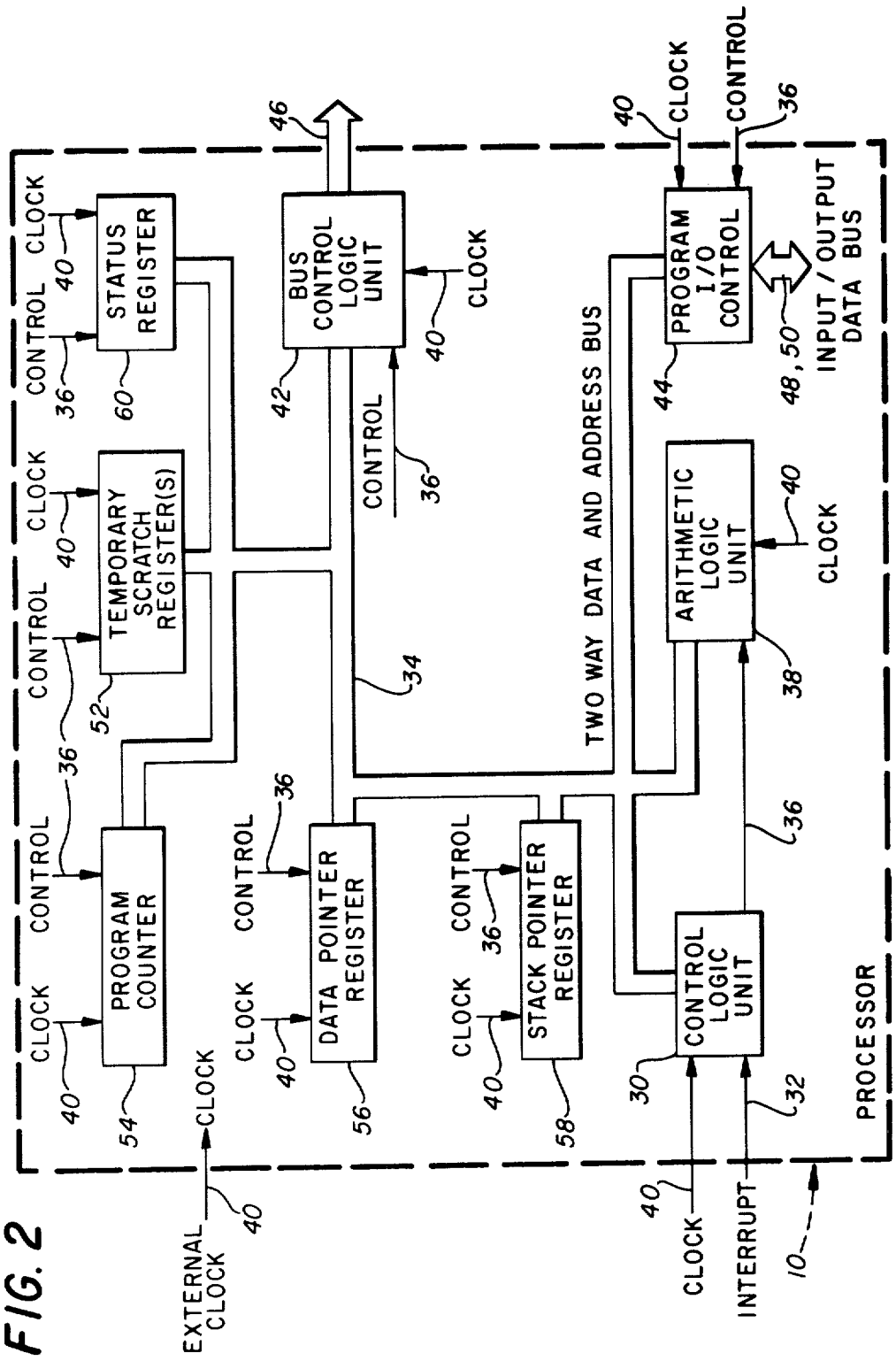
FIG. 2 is a block diagram showing logic hardware detail of the processor of FIG. 1 with interconnecting control and data bus paths.

Referring to FIG. 1, a text and data processing system is shown including a processor 10, interconnected by means of a data bus 12 and control lines 14 to a keyboard 16. Included on the keyboard are conventional alpha-numeric characters found on the standard typewriter keyboard. In addition the keyboard includes symbol keys, such as backspace, carrier return and tab settings along with function keys used to instruct the system to perform certain operations, to control the way a display is created, or to provide information about stored textual and/or record data. In addition, the keyboard includes code keys that are used in conjunction with another key to input special instructions to the processor 10.

Keystroke data transferred to the processor 10 over the data bus 12 in the form of 7-bit bytes is processed by instructions stored in a random access memory 18 by means of an interconnecting data bus 20. The random access memory 18 stores the keystroke data bytes, and file record data in addition to instructions for operation of the processor 10.

Also connected to the random access memory 18 by means of a data bus 22 is a display refresh buffer 24 that receives display data for formatting a visual presentation on a display screen 26. Control signals for operation of the display screen 26 are provided along a data bus 28.

Typically, the display screen 26 is a cathode ray tube, and in a preferred embodiment of the present invention, was formatted into multiple virtual images, the major one of which displayed twenty lines of text or data information. The total line capacity of the display was twenty-five lines with the first line reserved as a virtual display for document formatting information and the bottom two lines of the display reserved for virtual images as a prompt line and a message line to give an operator instructions on the control of the text/data processing system of FIG. 1.

Referring to FIG. 2, the processor 10 is further detailed to show typical logic hardware elements as found in such processors. The processor may be a commercially available unit, such as from Intel Corporation and identified by the Number 8086. Typically the processor includes a control logic unit 30 which responds to interrupts on a device bus 32 from the keyboard 16. The control logic unit 30 is also connected to the data and address bus 34 interconnected to various other logic units of the processor 10.

In response to a fetch instruction from the random access memory, the control logic unit 30 generates control signals to other logic elements of the processor. These control signals are interconnected to the various elements by means of a control line 36 which is illustrated directly connected to an arithmetic logic unit 38 and identified as a "control" line 36 to other elements of the processor. Synchronous operation of the control unit 30 with other logic elements of the processor 10 is achieved by means of clock pulses input to the processor from an external clock source. This instruction bus is also shown interconnected to other logic elements of the processor detailed on FIG. 2.

Data and instructions to be processed in the processor 10 are input through a bus control logic unit 42. Data to be processed may also come from program input/output control logic 44. The bus control logic 42 interconnects storage elements of the random access memory 18 and receives instructions for processing data received from the input/output control 44 or received from the random access memory. Thus, the input/output control 44 receives data from the keyboard 16 or the random access memory 18 while the bus control logic 42 receives instructions and/or data from the same memory. Note that different storage sections of the random access memory are identifiable for program storage and data storage.

Device control information from the processor 10 is output through the program input/output controller 44 over a data bus (12, 20). Input data on the data bus (12, 20) from the keyboard 16 is processed internally through the processor by instructions on the bus 34 to the status register 60. The arithmetic logic unit 38 in response to a control signal on line 36 and in accordance with instructions received on the memory bus 46 performs arithmetic computations which may be stored in temporary scratch registers 52. Various other transfers of data between the arithmetic logic unit 38 and other logic elements of the processor are of course possible. Such additional transfers may be to the status register 60, a data point register 56 or a stack pointer register 58. Also in the data stream for these various logic elements by means of the bus 34 is a program counter 54.

A particular operating sequence for the processor 10 is determined by instructions and data on the memory bus 46 and input data on the bi-directional bus (12, 20). As an example, in response to received instructions, the processor transfers data stored in the scratch registers 52 to one of the registers 56, 58 or 60. Such operations of processors as detailed in FIG. 2 are considered to be well known and understood by one of ordinary skill in the data processing field. A detailed description of each operation of the processor of FIG. 2 for the described invention would be counterproductive to an understanding of the invention as claimed.

Referring to FIG. 3, there is shown a block diagram of a typical operational format of the system of FIG. 1 for data processing and includes the keyboard 16 connected by way of a data bus 12 to the record display buffer 24. Also connected to the record display buffer 24 is the display 26 by means of the data bus 28. As formatted, the data processing system includes a printer 70 and a disk drive 80, all external devices, connected to data storage buffers enclosed within the dotted outline. It should be understood that each of the identifiable areas of buffer storage within the dotted outline comprise storage locations addressable by conventional techniques. Thus, keystrokes from the keyboard 16 are received by the display buffer 24 over the data bus 12.

Stored within memory of the system are application programs consisting of instructions and data bytes transferred between the various buffers including the display buffer 24, a sort buffer 64, a text storage buffer 76, and a data input/output buffer 82. As the name implies, the text storage buffer 76 contains a data stream of data for processing in accordance with the present invention.

The text storage buffer interconnects by means of data lines to the printer 70 and the disk drive 80. Record data from the disk drive 80 is transferred through the data input/output buffer 82 into the sort buffer 64 as will be explained. Records properly sorted within the sort buffer 64 are transferred through the input/output buffer 82 through the display buffer 24 to the display 26 by means of the data line 28. This record data is also transferred through the text storage buffer 76 to the printer 70 where stored instructions direct the making of a permanent hard copy record.

By operation of the system of FIGS. 1-3 in conjunction with the processor 10, in the manner to be described with reference to FIGS. 4-8, a sorting of file record data is made for presentation on the display screen 26.

Figure 4:
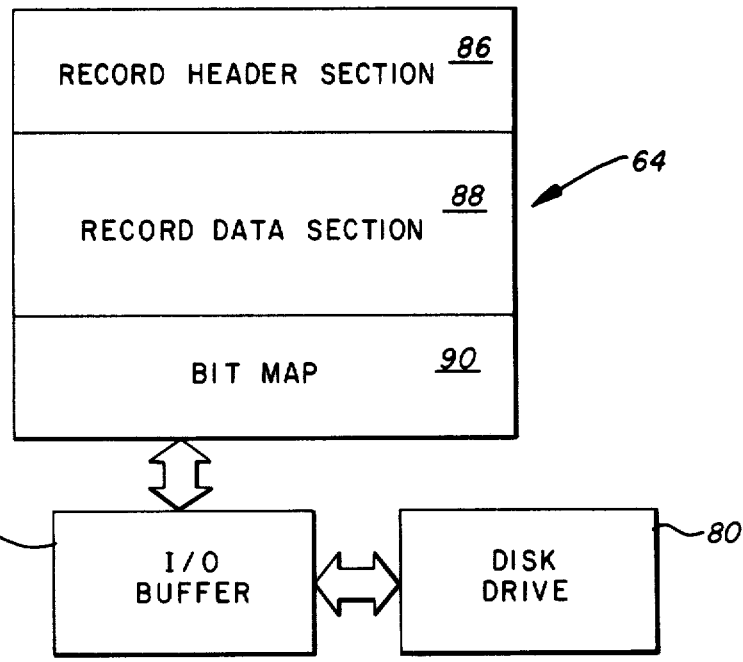
FIG. 4 is a block diagram showing data transfer and structuring of a sort buffer for receiving qualified data records.

Referring to FIG. 4, records to be sorted are stored on a disk which is inserted in the disk drive 80 for processing in accordance with a sort program previously stored. Stored on the disk along with a data record is the byte length of the record which information is required for sorting in accordance with the sorting program. Data records on the disk are sorted by evaluating one or more fields such as last name, zip code, and age. Typically, up to five fields are available for sorting data records. Each file record is read from the disk by the disk drive 80 and evaluated by the sort program and transferred through the input/output buffer 82 for storage in the sort buffer 64.

As configured, the sort buffer 64 includes a record header section 86, a record data section 88, and a bit map section 90, the latter being explained with reference to FIG. 8. The record header section includes a list of the length of each record in the data section 88 along with a pointer identifying the location of the record in the data section. While each entry into the header section 86 is of a fixed length, entries into the record data section vary with the length of the record transferred from the disk drive 80. In one embodiment on the invention, the sort program stores the record header bytes starting from the first position of the record section 86 and locates the record data starting at the last position in the record section 88. This technique makes maximum use of the sort buffer size.

Figure 5:
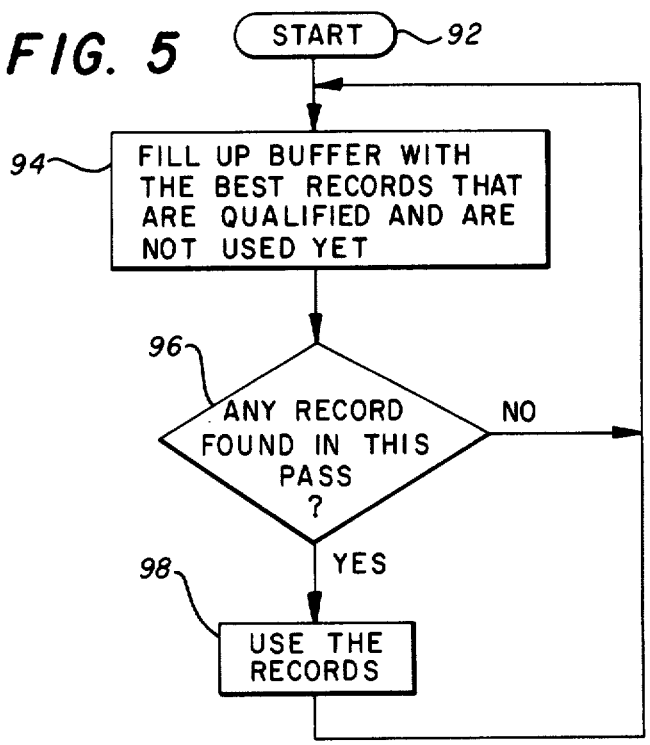
FIG. 5 is a high level flow chart for the basic algorithm for processing record data from a disk to the sort buffer on a record qualified basis.
Figure 6:
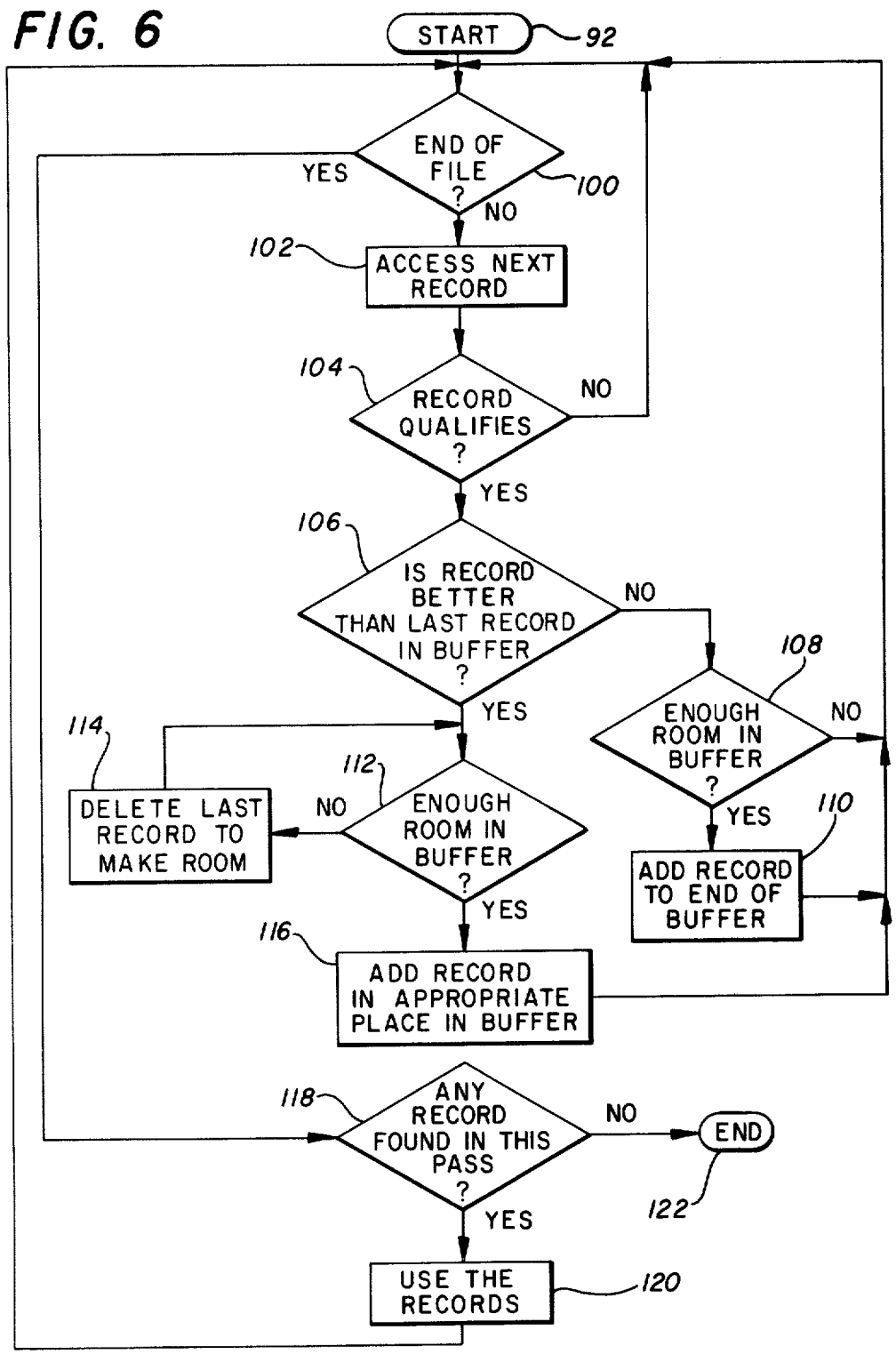
FIG. 6 is a more detailed flow chart of the basic algorithm as generalized in FIG. 5 showing the major functions for sorting file record data.
Figure 7:
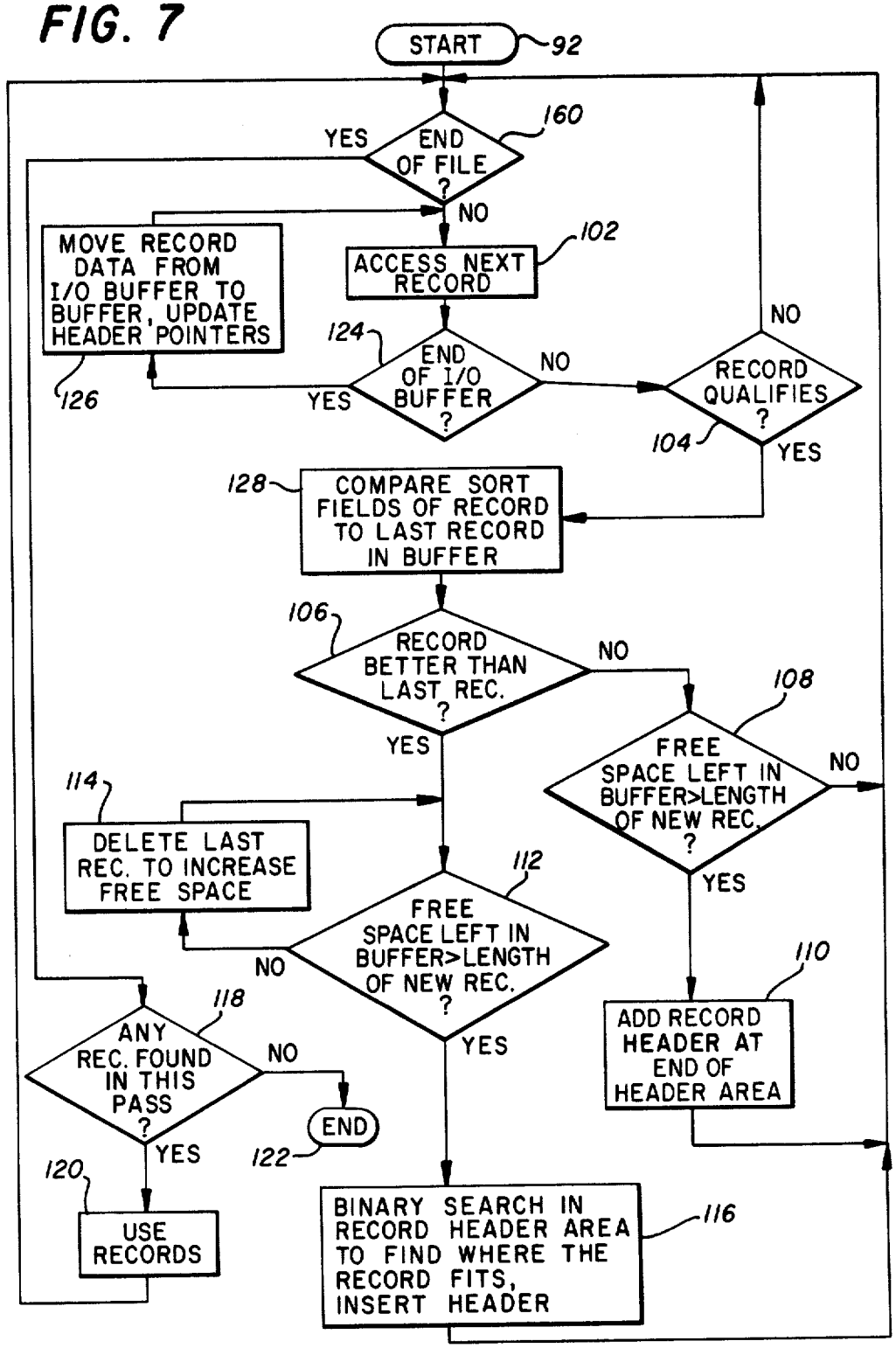
FIG. 7 is a detailed flow chart for qualifying, transferring and locating record data on a disk storage to a sort buffer for data handling in the text/data processing system of FIG. 1.

The speed with which sorting of record data from the disk drive 80 is completed depends on the storage length of the sort buffer 64. The sort algorithm to be detailed with reference to FIGS. 5-7 is a multiple pass algorithm that continues to transfer record data into the data section 88 until the next sorted record overflows the data section. The records sorted and stored in the data section 88 are then transferred out of the sort buffer 64 through the input/output buffer 82 to the display 26, or through the text storage buffer 76 to the printer 70, or for other use as appropriate. Thus, the larger the sort buffer, the fewer passes required of the sort program for clearing all records on a disk. Typically, the sort buffer varies from 8 K-bytes in length to 40 K-bytes which includes the three sections 86, 88 and 90.

Referring to FIG. 5, after the processor 10 receives a signal that a disk has been inserted into the disk drive 80, the sort program starts at entry 92 and proceeds to run the sequence of steps to complete the process of block 94. That is, each data record on the disk is qualified for selection and ranked for sorting and arranging in the sort buffer 64. The first record accessed on the disk is transferred through the input/output buffer 82 to the first position in the data section 88. The header section 86 is also loaded with pointers identifying the record, the record length in bytes and the address of the record in the data section 88.

After this first record has been located in the data section 88, an test 96 is made by the sort program to determine if there are additional records on the disk that have not been sorted and processed to the data section 88. If additional records are remaining on the disk, then the program recycles to block 94 to evaluate the next record on the disk. Ranking criteria of the next record is compared with ranking criteria of the previously transferred record to determine if it has a higher ranking or a lower ranking. For a record having a lower ranking than the previously transferred record, the data is transferred through the buffer 82 and located in the data section 88 at the next available storage location.

Information for the next record is stored in the header section 86, which as previously described, includes both record length and record location in the data section.

The algorithm recycles through 94 and 96 so long as there is a record on the disk that has not previously been transferred to the buffer 64. When the next record on the disk has ranking criteria with a higher level of rank than previously transferred records, the next record will be transferred through the buffer 82 and located in the data section 88 below the next highest ranked record in the data section. All records in the data section 88 having a lower ranking are relocated in the data section. Thus, each time a record is located in the data section 88 having a higher ranking than previously transferred records, a reassembly of the data is required. For example, if the records are being sorted on last names, and records A, B, F, M, and R have been previously transferred to the data section 88 and the next record is sorted on the record D, then all records having a ranking lower than D will be shifted in the data section 88. The new arrangement will then be as follows: A, B, D, F, M, R.

The above description of the sorting process assumes that space remains in the data section 88 for all of the previously transferred records. For each transfer of a record into the sort buffer 64, an evaluation is made by the sort program to determine if additional byte space is available in the data section for storage of transferred records. If the next record to be transferred has a lower ranking than any previously transferred records and its length would cause an overflow of the data section 88, then this next record will not be transferred into the data section. It should be noted, however, that the sort program continues to evaluate each record on the disk to determine if one of higher ranking than previously transferred records remains. A record of a higher ranking, as explained, will replace a record of a lower ranking. If the transferring of a record having a higher ranking causes the data section to overflow then records of a lower qualification will be deleted.

After the data section 88 has been filled to the extent possible without overflowing with the highest ranked records not previously sorted from the disk, the sort program makes the test 96 which results in an affirmative response and the program advances to a "use record" step 98 which outputs the record in the data section 88 to the disk 80 and also outputs the records to the printer 70 for producing hard copy. The data may also be used in other processes as required.

Referring to FIG. 6, there is shown in greater detail the sort algorithm as previously outlined in FIG. 5. The sort algorithm starts at entry 92 and completes a test 100 to determine if all the records on the disk have been processed for possible transfer into the data section 88. If the end of file test produces a negative result, then the algorithm advances to a step 102 to access the next record on the disk not previously sorted and transferred to the buffer 64 without subsequent deletion. The next record is evaluated at test 104 to determine if it qualifies for the sort program that is being run. For example, if the sorting is being made on last names beginning with the letters A through M and the next record is a last name beginning with the letter R, then the next record does not qualify for the sort and the sequence returns to the test 100. So long as the additional records are to be sorted from the disk the loop including 100, 102 and 104 recycles until a qualified record is found at test 104.

Upon location of a qualified record on the disk a test 106 is made to determine if the next record has a higher level of ranking than the last record located in the buffer 64. When the next record has a lower ranking than the last record located in the buffer then the test 106 produces a negative result and the sequence advances to a test 108 to determine if the next record will fit in the buffer 64 without overflowing the data section 88. If the length of the next record is in excess of the space available in the data section 88, then the sort sequence returns to the test 100.

The sequence including 100, 102, 104, 106 and 108 recycles each time the next qualified record has a lower level of ranking than the last record in the buffer 64 and the length of this record is greater than the space available in the data section 88.

When space is available in the data section 88 as determined by the test 108, then the sequence advances to a step 110 to transfer the next record through the buffer 82 into the data section 88. This next record is located following the last record stored in the data section. The identification, length and location of this record is also stored in the header section 86. After this next record has been added to the data section 88 at sequence step 110, the sort algorithm recycles to the "end of file" test 100.

When the next record has a higher ranking than the lowest ranked record in the buffer 64, the test 106 produces an affirmative result which advances the sequence to a test 112 to determine if sufficient byte space remains in the buffer 64 to accept the record under consideration. If the test 112 produces a negative response, the sequence advances to a step 114 which deletes the lowest ranked record from the buffer 64 and the processor recycles to the test 112. The sequence of test 112 and the step 114 are recycled, each time deleting the lowest ranked record from the buffer 64, until an affirmative result is produced at the test 112.

An affirmative result from the test 112 advances the sequence to a step 116 and the record which resulted in the affirmative result of the test 106 is added to the buffer 64 in the data section 88 with the record located in the sort order as determined by the sort algorithm. Following the location of this next record to the sort buffer 64 the sequence recycles to the "end of file" test 100.

The sequence of tests and steps 100, 102, 104, 106, 108, 110, 112, 114 and 116 is run until all the file records have been evaluated and the data section 88 has no more available byte space to accept the next qualified record on the disk. At this time the "end of file" test 100 produces an affirmative result and the sequence advances to a test 118. If any records are found to have been located in the data section 88 the test 118 produces an affirmative result advancing the sequence to a step 120 to configure the input/output buffer 82 to transfer the data record over the input/output bus to the disk 80 or other output device including the hard copy printer 70.

At the completion of the transfer of the records in the sort buffer 64 to the disk 80 or other output device, the sequence returns to test 100. The sequence starting at test 100 and continuing through step 116 is repeated for the next highest ranked records on the disk, that is, the next highest ranked following the lowest ranked record previously transferred from the buffer 64. The process as described above is recycled again loading the data section 88 with the highest ranked records still remaining on the disk. The test 118 and step 120 are again run and this next batch of records are transferred to the disk 80 or other output device. This recycle process continues until the test 118 produces a negative result indicating that on the previous pass no records were added to the data section 88 signifying that all records on the disk have been sorted. The sequence then steps to an "end" step 122 and the sort program shuts down the processor.

For a more detailed explanation of the sort process, reference is now made to FIG. 7. The flow chart of FIG. 7 adds additional detail to the flow chart of FIG. 6 and only such additional detail will be described with reference to FIG. 7. The sequence starts at entry 92 and after the test 100 the sequence advances to the "access next record" step 102 which is followed by a test to determine the condition of the input/output buffer 82. This test is made at 124. This sequence of the algorithm minimizes data movement between the disk drive 80 and the sort buffer 64 by loading the buffer 82 prior to transfer of data into the sort buffer. That is, file records from the disk drive 80 are batched into the input/output buffer 82 until this buffer is full. With the buffer 82 full, or not able to accept the next record, the test 124 produces an affirmative result and the sequence advances to a step 126 which moves all the data in the input/output buffer 82 into the sort buffer 64 as a batch.

The header section 86 is continuously updated with new pointers for the additional records being input and located into the data section 88. Note, that only those records having new pointers in header section 86 are transferred to data section 88. Thus, not all records transferred into the buffer 82 are subsequently transferred to the section 88. Those records not transferred from the buffer 82 are deleted from the buffer 82.

After the data in the input/output buffer 82 has been transferred into the sort buffer 64 the test 124 produces a negative result which advances the sequence to the test 104. A positive result of the test 104 advances the sequence to a step 128 which compares the sort fields of the next qualifying record on the disk with the sort fields of the lowest ranked record in the data section 88. It is during the running of this step that the location of the record is determined when transferred to the data section 88. After the level of ranking has been determined at the step 128, the sequence advances to the test 106 followed by the test 108 which evaluates if the free space left in the sort buffer 64 is greater than the length of the next qualifying record. As previously explained, a negative result recycles the sequence and a positive result adds the record at step 110 which also causes the sequence to recycle.

A positive result of the test 106 advances the sequence to the test 112 which determines if the free space left in the buffer 64 is greater than the length of the new record. If not, the step 114 is run to delete the last record to increase free space in the data section 88. When enough free space is made available in the data section 88 to accept the next qualifying record on the disk, the sequence advances through an affirmative route to the step 116 which makes a binary search of the data in the header section 86 to evaluate where the next record fits into the records previously transferred and located in the data section 88. Data identifying the record, its length, and its location in the data section 88, are inserted into the header 86 during running of the step 116. The sequence then returns to the test 100. When the data section 88 can accept no more records from the disk the sequence advances through the affirmative route to the test 118 and the step 120 or the end 122.

Figure 8:
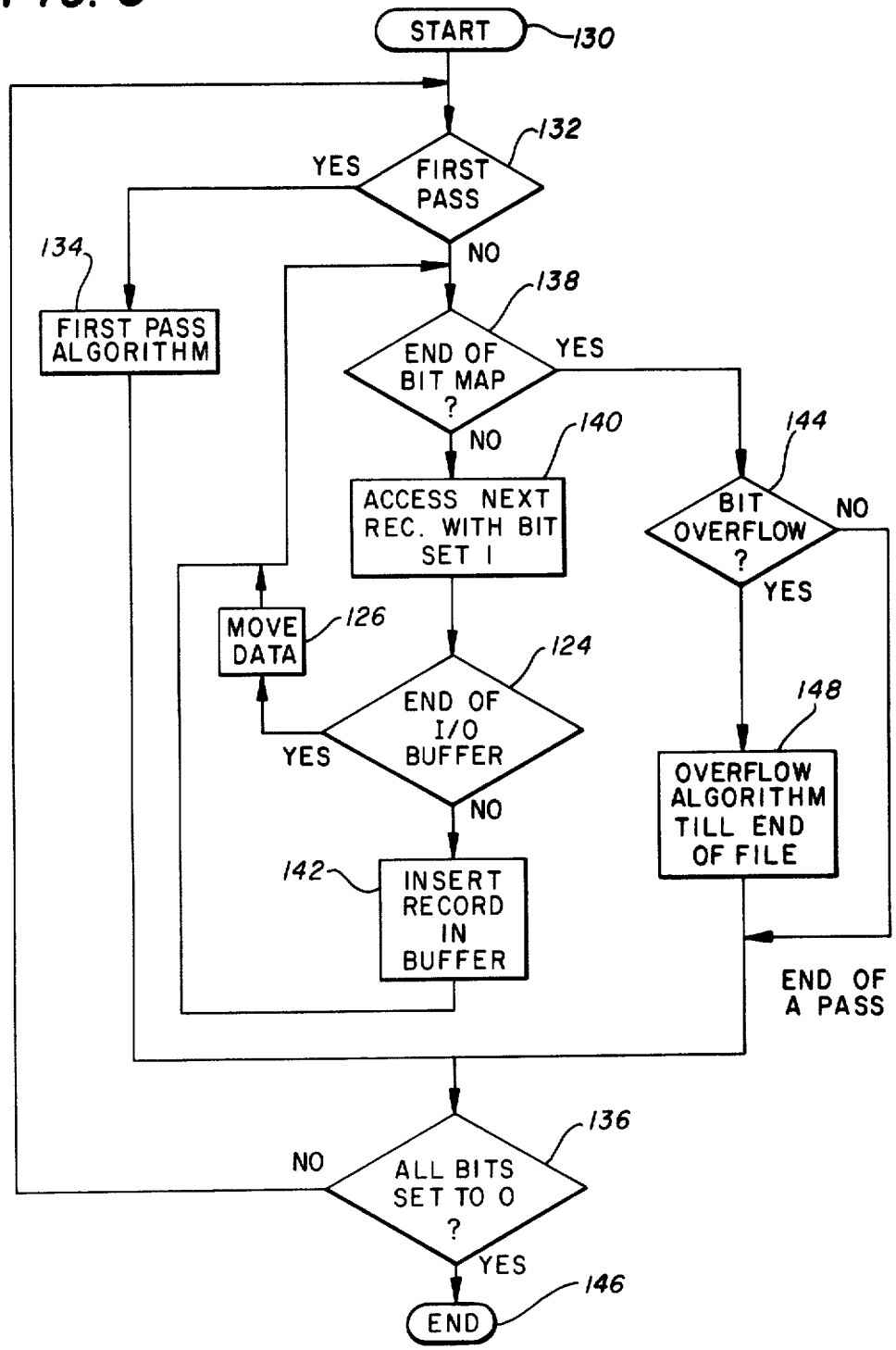
FIG. 8 is a flow chart of an algorithm for presorting record data prior to sorting and transferring to a sort buffer as detailed by the flow chart of FIG. 7.

Referring to FIG. 8, there is shown a flow chart of an expansion of the basic sort algorithm of FIGS. 5-7 which provides increased sort efficiency. The algorithm of FIG. 8 can be considered a presort sequence and utilizes the bit map section 90 of the sort buffer 64. With the program of FIG. 8 loaded into the processor 10 along with the basic sort program of FIGS. 5-7, the sorting of records on a disk inserted into the disk drive 80 commences at a start 130. Note, where the flow chart of FIG. 8 incorporates tests or steps previously described the same reference number will be applied.

Following the start 130, a "first pass" test 132 is made to determine if the records on the disk have been previously qualified by a first pass algorithm. In the first pass through the file the records are qualified and the test proceeds along the affirmative path to the first pass algorithm 134 which is detailed in FIG. 7 and commences at the "access next record" step 102. The algorithm of FIG. 7 is completed for the first pass to identify qualified records on the disk. Note, that in order to select the qualified records all the records in the file must be evaluated and qualified. At the same time, a record identifying bit is set for each record in the bit map section 90 by sequencing the algorithm of FIG. 8 through the test 136 along the negative path back to the first pass test 132.

When all the record identifying bits in the bit map section 90 are set to a first state (a logic ONE) and the data section 88 no longer contains sufficient space to accept the next highest ranked record, the test 100 produces an affirmative result advancing the sequence through the test 118 and the "use record" step 120 or step to the end 122.

Upon completion of the first pass all the record identifying bits of the records in the data section 88 that have been read out for use in the disk 80, or other output device, will have been set to the first state and then reset to the second state (logic ZERO) indicating that the record has been sorted and need not be considered again for future passes through the disk file. All other records on the disk will have the record identifying bit set to the first state. Upon completion of the first pass the test 132 causes the sequence to proceed along the negative path to a test 138 to determine if additional first state bits are found in the section 90. If additional first state bits are available the negative path from the test 138 is followed to an "access record" step 140 which searches the disk file for the next record with the record identifying bit set to one, that is, the first state. Following identification of the next record with an identifying bit set to one, the test 124 is made which proceeds along the affirmative path to the "move record" step 126 and back to the "end of bit map" test 138.

If additional space remains in the buffer 64 the sequence of FIG. 8 advances to an "insert record" step 142 which begins at the comparison step 128 of FIG. 7 and follows the path there detailed. However, the negative path from the test 108 returns the sequence of FIG. 8 to the "end of bit map" test 138 as does a completion of the "add record" step 110 and also a completion of the binary search step 116. Thus, the "insert record" step 142 includes comparison of the header data in the header section 86 and space management of the sort buffer 64 as previously described. Note, that during the pass of the sequence through the step 140 all those records that have the record identifying bit set to zero, that is, the second state, will be bypassed thereby reducing the number of records that must be evaluated for transfer to the data section 88 of the buffer 64.

Following the running of step 142, each time the data section 88 includes the most qualified records remaining in the disk file having a record identifying bit in the first state, the sequence including test 118 and step 120 are run to output these records as previously described. The records thus transferred from the data section 88 will have the record identifying bit then set to zero, that is, the second state.

The sequence through path of test 138 and step 140 continues until all of the record identifying bits in the bit map section 90 are reset to the second state as shown by a positive result of the test 138. Following the positive path from the test 138 the sequence advances to a bit overflow test 144 which produces a negative result when the bit map section 90 had sufficient space to contain a record identifying bit for each record on the disk. Thus, the sequence from test 138 through step 140 continues for each bit in the bit map until the last bit has been checked.

With the last bit in the bit map section 90 checked and a negative result from the test 144 the sequence advances to the test 136 and if a record identifying bit in the map section 90 is in the first state, that is, a one, then the program recycles to the first pass test 132 and again takes up at the "end of bit map" test 138. This sequence continues until all the record identifying bits have been set to zero advancing the program through the test 136 along the affirmative path to the end 146. At this time all the qualifying records on the disk have been sorted through the sort buffer 64 and output to the disk 80 or other output device.

When the number of records to be sorted is greater than the space available for record identifying bits in the map section 90, the first pass algorithm 134 will be run as previously described with one exception. That is, when the last record identifying bit is located, and more than one record remains on the disk, all remaining records will be assigned to the last record identifying bit. After the first pass the test 132 advances the sequence to the test 138 which inserts records into the data section 88 as previously explained through step 140, test 142, step 126 and step 142.

When all of the record identifying bits in the bit map section have been reset to the second state as determined by the test 138 the overflow test 144 is made which, when the overflow bit has been set, will produce a positive result advancing the presort algorithm to a step 148. Step 146 resets the processor to run the program of FIG. 7 for each record covered by the overflow bit. The algorithm of FIG. 7 is run until the "end of file" test 100 produces a positive response thereby advancing the sequence to the test 136 which recycles the algorithm of FIG. 8 to the first pass test 132.

After all the records assigned to the overflow bit have been evaluated for sorting and the data section 88 loaded with the highest ranked records the algorithm follows through the path of tests 132 and 138 through the step 140, again sorting records assigned identifying bits. Again the test 144 and the step 148 are completed for records in the overflow bit. The presort program then continues until all the records in the disk file have been sorted into the buffer 64 and transferred to an output device.

Each of the tests and steps of the algorithms as illustrated by the flow charts of FIGS. 7 and 8 is also described by the psuedocode of the following table. The psuedocode is a list of each instruction for running the sort and presort algorithms on the test/data processing machine of FIG. 1.

TABLE I

```
*************************-*PSEUDOCODE*-**********************       00022900
            BEGIN (GET NEXT SORTED RECORD)                          00023000
         1. IF SORTING (RSOCNOST OFF) THEN                          00023100
         2. . IF CALL IS NOT FIRST THEN                             00023200
         3. . . IF ADVANCE IS FOR NEXT RECORD THEN                  00023300
         4. . . . IF RECORD NOT ALREADY COLLECTED                   00023400
                    THEN                                            00023500
         5. . . . . INDICATE PREVIOUS RECORD PRINTED                00023600
                    IN SORT MAP                                     00023700
         5. . . . . DECREMENT # HEADERS IN SORT                     00023800
                    BUFFER                                          00023900
         5. . . . . IF MORE RECORDS LEFT IN BUFFER                  00024000
                    THEN                                            00024100
         6. . . . . . INCREMENT TO NEXT RECORD                      00024200
         5. . . . . ELSE EMPTY SORT BUCKET                          00024300
         6. . . . . . DO COMPLETE PASS OF FILE -                    00024400
                       SORTING ANOTHER BUCKET FULL                  00024500
                       OF BEST RECORDS                              00024600
         5. . . . . ENDIF                                           00024700
         4. . . . ELSE RE-ACCESS RECORD                             00024800
         5. . . . . INCREMENT TO NEXT HEADER                        00024900
         5. . . . . TURN OF RE-ACCESS INDICATOR                     00025000
         5. . . . . DECREMENT NUMBER OF HEADERS                     00025100
         4. . . . ENDIF RE-ACCESS                                   00025200
```

TABLE I (cont.)

```
                    3. . . ELSE PREVIOUS OR CURRENT              00025300
                    4. . . . IF PREVIOUS RECORD THEN             00025400
                    5. . . . . IF SORT NOT PREVIOUSLY            00025500
                                TERMINATED THEN                  00025600
                    6. . . . . . POSITION TO PREVIOUS HEADER     00025700
                    6. . . . . . INDICATE RE-ACCESSING OF        00025800
                                CURRENT NEEDED                   00025900
                    6. . . . . . INCREMENT NUMBER OF HEADERS IN  00026000
                                BUCKET                           00026100
                    5. . . . . ELSE SORT TERMINATED              00026200
                    6. . . . . . TURN OFF TERMINATION TO ALLOW   00026300
                                RECORD PASSING                   00026400
                    6. . . . . . POSITION TO LAST RECORD IN      00026500
                                BUCKET                           00026600
                    5. . . . . ENDIF SORT PREVIOUSLY TERMINATED  00026700
                    4. . . . ENDIF PREVIOUS                      00026800
                    3. . . ENDIF ADVANCE                         00026900
                    2. . ELSE CALL IS FIRST                      00027000
                    3. . . DO FIRST CALL INITIALIZATION -        00027100
                                GETTING FIRST RECORD IF NOT      00027200
                                SORTING                          00027300
                    3. . . IF SORTING THEN                       00027400
                    4. . . . DO COMPLETE PASS OF FILE - SORTING  00027500
                                BUCKET FULL OF BEST RECORDS      00027600
                    3. . . ENDIF                                 00027700
                    2. . ENDIF FIRST CALL                        00027800
                    1. ELSE NOT SORTING                          00027900
                    2. . DO NO SORT                              00028000
                    1. ENDIF SORTING                             00028100
                    1. IF TERMINATION FLAG IS OFF AND IF ERROR   00028200
                                FLAG IS OFF THEN                 00028300
                    2. . IF SORTING (RSOCNOST OFF) THEN          00028400
                    3. . . DO PASS RECORD                        00028500
                    3. . . GET CURRENT RECORD ID (RSOCURID)      00028600
                                FROM HEADER (RSOHSRID)           00028700
                    2. . ELSE NOT SORTING                        00028800
                    3. . . GET CURRENT RECORD ID (RSOCURID)      00028900
                                FROM FM (RFMCBCRN)               00029000
                    2. . ENDIF SORTING                           00029100
                    2. . SET RETURN CODE SUCCESSFUL              00029200
                    1. ENDIF TERMINATION                         00029300
                    1. SET FM EOB INDICATOR OFF                  00029400
                    1. RETURN TO CALLER                          00029500
                          END (GET NEXT SORTED RECORD)           00029600
***********************-END-PSEUDOCODE-*************************  00029700
      EJECT                                                       00029800
***************************************************************  00029900
                  NOSORT - NO SORT                             *  00030000
***************************************************************  00030100
                                                               *  00030200
      FUNCTION: FOR CONDITIONS WHERE SORTING IS NOT NEEDED, PROVIDE * 00030300
                LLPP LIST DIRECTLY FROM QUALIFY OR FILE MANAGER TO  * 00030400
                SORTS INVOKER.                                 *  00030500
      INPUT: DS - SOCB                                         *  00030600
             ES - FMCB                                         *  00030700
                                                               *  00030800
      OUTPUT: DIRECTLY OR THROUGH LOWER ROUTINES, SETS UP OUTPUT * 00030900
              IN RSOCOVAL AND RSOCSVAL.                        *  00031000
                                                               *  00031100
```

TABLE I (cont.)

```
NOTES:  THIS ROUTINE PASSES RSOCRCFL FROM LOWER ROUTINES BACK TO    * 00031200
        CALLING ROUTINE.                                            * 00031300
                                                                    * 00031400
        INITIAL REWIND OF THE FILE IS CAUSED BY FIRST CALL TO       * 00031500
        RQLGNQR IN A LOWER LEVEL ROUTINE.                           * 00031600
                                                                    * 00031700
************************************************************************ 00031800
******************-*PSEUDOCODE*-**************************************** 00031900
                BEGIN (NO SORT)                                       00032000
            1.  SET FM EOB FLAG OFF                                   00032100
            1.  IF OPTION IS TO ADVANCE AND NOT                       00032200
                    RE-ACCESSING A RECORD THEN                        00032300
            2.  .  CLEAR ALL RECORD ERROR CONDITIONS                  00032400
                    (RSOCRCFL)                                        00032500
            2.  .  SAVE CURRENT RECORD ID                             00032600
            2.  .  DO QUALIFY INVOKE TO GET NEXT RECORD               00032700
            1.  ELSE CURRENT, PREVIOUS, OR RE-ACCESS                  00032800
            2.  .  IF OPTION IS RE-ACCESS ADVANCE OR                  00032900
                    PREVIOUS THEN                                     00033000
            3.  .  .  IF RE-ACCESS ADVANCE THEN                       00033100
            3.  .  .  ELSE PREVIOUS                                   00033200
            4.  .  .  .  INDICATE CURRENT RECORD WILL BE              00033300
                          RE-ACCESSED                                 00033400
            4.  .  .  .  SAVE RECORD ID OF CURRENT RECORD             00033500
            3.  .  .  ENDIF RE-ACCESS ADVANCE                         00033600
            3.  .  .  LOCATE RECORD                                   00033700
            3.  .  .  IF RECORD ERROR THEN                            00033800
            4.  .  .  .  ANALYZE THE RETURN CODE                      00033900
            3.  .  .  ENDIF RECORD ERROR                              00034000
            2.  .  ENDIF RE-ACCESS OR PREVIOUS                        00034100
            2.  .  IF NO ERRORS LOCATING RECORD THEN                  00034200
            3.  .  .  CALL RFMGFELD TO GET FIELDS OF                  00034300
                        CURRENT RECORD                                00034400
            2.  .  ENDIF NO ERRORS                                    00034500
            1.  ENDIF CURRENT OPTION                                  00034600
            1.  SET SEGMENT OF POINTERS (RSOCSPTR) = FM               00034700
                    SEGMENT OF POINTERS                               00034800
            1.  SET FIRST CALL INDICATOR OFF                          00034900
                END (NO SORT)                                         00035000
******************-END-PSEUDOCODE-*************************************** 00035100
        EJECT                                                         00035200
************************************************************************* 00035300
                CMPPASS - COMPLETE PASS OF FILE                     * 00035400
************************************************************************* 00035500
  FUNCTION: CONTROL A SINGLE PASS OF THE FILE FROM BEGINING TO END.* 00035600
            RESET FLAGS, POINTERS AND REWIND BEFORE STARTING THE    * 00035700
            PASS. CONTROL GETTING EACH RECORD, SORTING THE RECORD   * 00035800
            AND HANDLING ERROR CONDITIONS. AT END OF THE PASS       * 00035900
            RESET OVERFLOW FLAG IF ALL OVERFLOW RECORDS ARE         * 00036000
            PROCESSED.                                              * 00036100
  INPUT:                                                            * 00036200
                                                                    * 00036300
                                                                    * 00036400
  OUTPUT:   RSOCURHD                                                * 00036500
            RSOCNHDR                                                * 00036600
                                                                    * 00036700
  NOTES:    THIS ROUTINE IS CALLED ONLY WHEN SORTING IS REQUIRED.   * 00036800
                                                                    * 00036900
                                                                    * 00037000
```

TABLE I (cont.)

```
************************************************************ 00037100
*************************-*PSEUDOCODE*-********************* 00037200
          BEGIN (COMPLETE PASS OF FILE)                       00037300
    1. INITIALIZE FOR SCANNING BIT MAP                        00037400
    1. CLEAR ALL RECORD ERROR CONDITIONS                      00037500
          (RSOCRCFL)                                          00037600
    1. INVOKE FM TO REWIND FILE (RFMLUNQR)                    00037700
    1. IF NOT A PERMANENT ERROR THEN                          00037800
    2. . SET ADDITION INHIBIT FLAG OFF                        00037900
    2. . SET EOB CONTROL BIT ON (RSOCCNTL)                    00038000
    2. . SET FM EOB FLAG OFF INDICATING NOT TO                00038100
            RETURN EOB                                        00038200
    2. . SET OVERFLOW PROCESSING FLAG OFF                     00038300
          (RSOCOVPR)                                          00038400
    2. . RESET PREVIOUS RECORD ID TO ZERO                     00038500
    2. . IF OVERFLOW SORT THEN SAVE WORST CASE                00038600
            PRINTED                                           00038700
    3. . . MOVE WORST CASE HEADER                             00038800
    3. . . SAVE DATA VALUES                                   00038900
    3. . . UPDATE POINTERS TO NEW LOCATION                    00039000
    2. . ELSE NO WORST CASE PRINTED TO BE SAVED               00039100
    3. . . SET END OF AVAILABLE SPACE                         00039200
    2. . ENDIF                                                00039300
    2. . RESET BEGINING OF HEADER POINTER                     00039400
    2. . RESET CURRENT HEADER POINTER                         00039500
    2. . SET CURRENT BIT MAP POINTER TO                       00039600
            BEGINING OF MAP                                   00039700
    1. ELSE PERMANENT ERROR ON REWIND                         00039800
    2. . SET ERROR FLAG ON                                    00039900
    1. ENDIF                                                  00040000
    1. WHILE NOT A COMPLETE PASS OF FILE AND NO               00040100
            RECORD ERROR CONDITIONS (EOF,                     00040200
            TERMINATION AND ERROR CAUSE LOOP                  00040300
            TERMINATION. EOB ALWAYS RESET)                    00040400
    2. . IF EOB CONTROL BIT IS OFF THEN                       00040500
    3. . . SET FM EOB INDICATOR ON (RFMCBEBP)                 00040600
    2. . ENDIF                                                00040700
    2. . DO GET A RECORD                                      00040800
    2. . SET EOB CONTROL BIT OFF (RSOCCNTL)                   00040900
    2. . IF RECORD FOUND THEN                                 00041000
    3. . . DO SORT LOGIC TO SORT THE RECORD                   00041100
            INTO THE BUCKET                                   00041200
    2. . ELSE RECORD ERROR                                    00041300
    3. . . IF EOB (RSOCEOBF) THEN                             00041400
    4. . . . DO FM EOB TO PROCESS END OF BUF                  00041500
    4. . . . SET FM EOB INDICATOR OFF                         00041600
            (RFMCBEBP)                                        00041700
    4. . . . SET EOB CONTROL ON (RSOCCNTL)                    00041800
    4. . . . SET EOB FLAG OFF (RSOCEOBF)                      00041900
    3. . . ELSE EOF, ERROR, OR TERMINATION                    00042000
    4. . . . IF EOF (RSOCEOFF) THEN                           00042100
    5. . . . . CHECK FOR END AND COPY FIELD                   00042200
                VALUES                                        00042300
    4. . . . ENDIF EOF                                        00042400
    3. . . ENDIF EOF, ERROR, OR TERM                          00042500
    2. . ENDIF RECORD FOUND                                   00042600
    1. ENDDO NOT A COMPLETE PASS                              00042700
    1. SET FIRST CALL FLAG OFF                                00042800
    1. IF TYPE OF SORT IS OVERFLOW AND IF EOF                 00042900
```

TABLE I (cont.)

```
                        FLAG IS SET AND IF OVERFLOW CHECK         00043000
                        (RSOCOVCK) IS OFF THEN                    00043100
                    2. . SET OVERFLOW BIT IN BIT MAP OFF          00043200
                    2. . RESET TYPE OF SORT TO BIT                00043300
                    2. . FREE THE WORST CASE PRINTED SPACE        00043400
                    1. ENDIF TYPE OF SORT                         00043500
                        END (COMPLETE PASS OF FILE)               00043600
************************-END-PSEUDOCODE-************************* 00043700
     EJECT                                                        00043800
***************************************************************** 00043900
            FCALINIT - FIRST CALL INITIALIZATION            *     00044000
***************************************************************** 00044100
    FUNCTION: INITIALIZE THE SOCB AND SORT BUCKET ON THE FIRST PASS * 00044200
              OF THE FILE. DETERMINE IF SORTING IS REQUIRED.        * 00044300
              IF NO SORTING THE GET FIRST RECORD.                   * 00044400
                                                                    * 00044500
    INPUT: DI - 0                                                   * 00044600
                                                                    * 00044700
                                                                    * 00044800
    OUTPUT: RSOCNOST - SET ON IF NOT SORTING CASE                   * 00044900
            RSOCFORC - SET ON IF SORTING IS FORCED TO OCCUR         * 00045000
            DI AND SI 0                                             * 00045100
    NOTES:                                                          * 00045200
                                                                    * 00045300
                                                                    * 00045400
***************************************************************** 00045500
**********************-*PSEUDOCODE*-***************************** 00045600
                        BEGIN (FIRST CALL INITIALIZATION)         00045700
                    1. IF NUMBER OF SORT FIELDS IS NON-ZERO AND   00045800
                        FIRST SORT FIELD NUMBER IS REC-ID AND     00045900
                        FIRST SORT ORDER IS ASCENDING AND         00046000
                        SPECIAL CASE DUPLICATE FLAG IS OFF        00046100
                        THEN                                      00046200
                    2. . SET NUMBER OF SORT NUMBERS TO ZERO SO    00046300
                        SORT WILL NOT BE USED                     00046400
                    1. ENDIF                                      00046500
                    1. IF SPECIAL CASE DUPLICATE (RSOCSPDP) AND   00046600
                        NO SORT SPECIFIED (RSOCNSOR) THEN         00046700
                    2. . SET NUMBER OF SORT FIELDS TO ONE         00046800
                    2. . SET FIRST SORT FIELD NUMBER TO REC-ID    00046900
                    2. . SET FIRST SORT ORDER TO ASCENDING        00047000
                    2. . SET FIRST SORT TYPE TO ARITHMETIC        00047100
                    2. . SET FORCED SORT FLAG ON                  00047200
                    1. ENDIF                                      00047300
                    1. SET NUMBER-OF-MOVES = NUMBER OF COMPLETE   00047400
                        FIELD NUMBERS (RSOCNCMP)                  00047500
                    1. SET DESTINATION TO START OF BUCKET         00047600
                    1. SAVE START                                 00047700
                    1. SET SOURCE OF LIST                         00047800
                    1. WHILE NUMBER-OF-MOVES NOT ZERO DO          00047900
                    2. . MOVE FIELD NUMBER TO DESTINATION         00048000
                    2. . INCREMENT TO NEXT DESTINATION            00048100
                    1. ENDDO                                      00048200
                    1. SET OFFSET OF COMPLETE LIST = OFFSET OF    00048300
                        BEGINNING OF SORT BUCKET                  00048400
                    1. SET SEGMENT OF COMPLETE LIST = SEGMENT     00048500
                        OF SORT BUFFER                            00048600
                    1. WHILE NUMBER OF SORT FIELD NUMBERS IS      00048700
                        NON-ZERO DO                               00048800
```

TABLE I (cont.)

```
          2. . SEARCH COMPLETE LIST FOR SORT FIELD         00048900
               NUMBER UNTIL NUMBER FOUND OR END OF         00049000
               LIST                                        00049100
          2. . IF FIELD NUMBER NOT FOUND THEN              00049200
          3. . . ADD NUMBER TO COMPLETE LIST               00049300
               (RSOCOCMP, RSOCSCMP)                        00049400
          3. . . INCREMENT NUMBER IN COMPLETE LIST         00049500
          2. . ELSE NUMBER LOCATED                         00049600
          3. . . POSITION TO LOCATION                      00049700
          2. . ENDIF FIELD NUMBER                          00049800
          2. . SET RELATIVE POSITION IN RELATIVE LIST      00049900
               (RSOCRELS)                                  00050000
          2. . INCREMENT TO NEXT SORT FIELD NUMBER         00050100
          1. ENDDO                                         00050200
          1. SAVE NUMBER IN COMPLETE LIST                  00050300
          1. SET OFFSET OF FIELD VALUE LIST                00050400
               (RSOCOVAL) = (NUMBER OF COMPLETE FIELD      00050500
               NUMBERS * LENGTH OF FIELD NUMBER) +         00050600
               OFFSET OF COMPLETE FIELD NUMBER LIST        00050700
               (RSOCOCMP)                                  00050800
          1. SET SEGMENT OF FIELD VALUE LIST TO            00050900
               SEGMENT OF SORT BUCKET                      00051000
          1. RESTORE ES TO FMCB                            00051100
          1. IF NUMBER OF SORT FIELDS (RSOCNSOR) IS        00051200
               NONZERO THEN                                00051300
          2. . RESERVE SPACE FOR QUALIFY TO PASS BACK      00051400
               LLPP LIST. THE FORMULA IS # FIELDS X        00051500
               4 BYTES                                     00051600
          2. . SET HEADER SIZE = SIZE OF HEADER            00051700
               DESCRIPTOR (RSOHDSZ) + (NUMBER OF           00051800
               COMPLETE FIELD NUMBERS * LENGTH OF A        00051900
               FIELD VALUE ELEMENT)                        00052000
          2. . SET BEGINING OF HEADERS (RSOCBEGH) =        00052100
               (NUMBER OF COMPLETE FIELD NUMBERS *         00052200
               LENGTH OF A FIELD VALUE ELEMENT) +          00052300
               OFFSET OF FIELD VALUE LIST                  00052400
               (RSOCOVAL)                                  00052500
          2. . SET BEGINING OF AVAILABLE SPACE             00052600
               (RSOBEGA) = BEGINING OF HEADERS             00052700
               (RSOBEGH)                                   00052800
          2. . SET VALUE POINTERS TO SOCB                  00052900
          1. ELSE NO SORT                                  00053000
          2. . SET NO SORT FLAG ON (RSOCNOST)              00053100
          2. . DO NO SORT                                  00053200
          1. ENDIF NO SORT                                 00053300
              END (FIRST CALL INITIALIZATION)              00053400
*********************-END-PSEUDOCODE-**********************  00053500
     EJECT                                                 00053600
************************************************************* 00053700
          PASSREC - PASS RECORDS                         *  00053800
************************************************************* 00053900
     FUNCTION: SET UP LLPP LIST BASED ON FIELD NUMBERS FOR CURRENT  * 00054000
               REQUEST. SET REASON CODE TO LAST RECORD IN BUFFER    * 00054100
               IF SPECIAL CASE DUPLICATE AND LAST RECORD IN BUFFER. * 00054200
     INPUT:    DS - SOCB SEGMENT                                    * 00054300
                                                                    * 00054400
               RSOCURHD                                             * 00054500
     OUTPUT:   LLPP LIST IS FORMED AT LOCATION RSOCOVAL             * 00054600
```

TABLE I (cont.)

```
                AH SET TO RSOCRSLT IF CONDITIONS MET FOR SP. CASE DUP.  *  00054700
                                                                        *  00054800
    NOTES:   CURRENT FIELD NUMBER MUST BE IN COMPLETE LIST              *  00054900
                                                                        *  00055000
                                                                        *  00055100
*************************************************************************  00055200
***************************-*PSEUDOCODE*-********************************  00055300
                     BEGIN (PASS RECORD)                                   00055400
                     1. SET POINTER TO FIRST POSITION IN FIELD             00055500
                        VALUE LIST                                         00055600
                     1. WHILE NUMBER OF CURRENT FIELD NUMBERS IS           00055700
                        NON-ZERO DO                                        00055800
                     2. . LOCATE LLPP WHICH CORRESPONDS TO THE             00055900
                            FIELD NUMBER IN THE CURRENT FIELD              00056000
                            NUMBER LIST                                    00056100
                     2. . SET UP DESTINATION FOR SCAN                      00056200
                     2. . MOVE LLPP ENTRY INTO FIELD VALUE LIST            00056300
                     2. . INCREMENT TO NEXT FIELD VALUE LIST               00056400
                     1. ENDDO                                              00056500
                     1. IF SPECIAL CASE DUPLICATE FLAG IS ON               00056600
                          (RSOCSPDP) AND RECORD IS LAST IN SORT            00056700
                          BUCKET THEN                                      00056800
                     2. . SET REASON CODE = LAST RECORD REASON             00056900
                            CODE                                           00057000
                     1. ENDIF SCP                                          00057100
                     END (PASS RECORD)                                     00057200
*********************-END-PSEUDOCODE-************************************  00057300
    EJECT                                                                  00057400
*************************************************************************  00057500
                    GETAREC - GET A RECORD                              *  00057600
*************************************************************************  00057700
   FUNCTION: GET THE NEXT RECORD. IF THIS IS THE FIRST PASS OF THE      *  00057800
             FILE, SET UP THE BIT MAP ELSE USE THE BIT MAP TO           *  00057900
             DETERMINE WHICH RECORD TO EXAMINE NEXT.                    *  00058000
   INPUT:    RSOCWORD, RSOCTWRD, RSOCXNUM, RSOCXWRD                     *  00058100
                                                                        *  00058200
                                                                        *  00058300
   OUTPUT: AX                                                           *  00058400
           RSOCRCFL IS PASSED FROM LOWER LEVEL ROUTINES                 *  00058500
           RSOCWORD, RSOCXNUM, RSOCXWRD                                 *  00058600
   NOTES:  RSOCXNUM IS RELATIVE TO ZERO BEGINING                        *  00058700
                                                                        *  00058800
                                                                        *  00058900
*************************************************************************  00059000
***************************-*PSEUDOCODE*-********************************  00059100
                                                                           00059200
                     BEGIN (GET A RECORD)                                  00059300
                     1. IF NOT FIRST CALL THEN                             00059400
                     2. . IF NOT PROCESSING AN OVERFLOW PORTION            00059500
                     3. . . LOCATE NEXT BIT IN MAP WHICH IS ON             00059600
                     3. . . IF FOUND THEN                                  00059700
                     4. . . . CALCULATE RECORD NUMBER                      00059800
                     4. . . . IF RECORD IN ONE BIT PER RECORD              00059900
                                SECTION THEN                               00060000
                     5. . . . . IF RECORD NOT LOCATED NEXT TO              00060100
                                  PREVIOUS RECORD THEN NOTE THAT           00060200
                                  DX IS SOMETIMES ZERO DUE TO              00060300
                                  RE-ACCESS                                00060400
                     6. . . . . . INVOKE FM LOCATE UNIQUE RECORD           00060400
```

TABLE I (cont.)

```
                       (RFMLUNQR)                          00060500
         5. . . . . ELSE ADJACENT RECORDS                  00060600
         6. . . . . . INVOKE FM LOCATE NEXT RECORD         00060700
                       (RFMLNXTR)                          00060800
         5. . . . . ENDIF AJACENT RECORDS                  00060900
         5. . . . . DO RCAQLFM TO ANALYZE RETURN           00061000
                       CODE                                00061100
         4. . . . ELSE OVERFLOW BIT                        00061200
         5. . . . . SAVE RECORD ID IN CASE EOB IS          00061300
                       RECEIVED                            00061400
         5. . . . . SET OVERFLOW PROCESSING ON             00061500
         5. . . . . SET OVERFLOW CHECK OFF                 00061600
         5. . . . . POSITION FM TO RECORD BEFORE           00061700
                       OVERFLOW                            00061800
         5. . . . . IF NO ERROR THEN                       00061900
         6. . . . . . DO OVERFLOW PASS TO FIND NEXT        00062000
                       RECORD                              00062100
         5. . . . . ELSE ERROR                             00062200
         6. . . . . . RESET OVERFLOW PROCESSING            00062300
         6. . . . . . INDICATE MUST TRY FOR RECORD         00062400
                       AGAIN                               00062500
         6. . . . . . ANALYZE THE RETURN CODE              00062600
         5. . . . . ENDIF NO ERROR                         00062700
         4. . . . ENDIF OVERFLOW BIT                       00062800
         3. . . ELSE NO BIT FOUND                          00062900
         4. . . . IF BUCKET IS EMPTY THEN                  00063000
         5. . . . . DO TERMINATION TO TERMINATE SORT       00063100
         4. . . . ELSE BUCKET HAS RECORDS                  00063200
         5. . . . . SET EOF FLAG ON (RSOCEOFF)             00063300
         4. . . . ENDIF BUCKET EMPTY                       00063400
         3. . . ENDIF BIT FOUND                            00063500
         2. . ELSE PROCESSING OVERFLOW RECORDS             00063600
         3. . . DO OVERFLOW PASS TO FIND NEXT RECORD       00063700
         2. . ENDIF BIT SORT                               00063800
         1. ELSE FIRST CALL                                00063900
         2. . DO QUALIFY INVOKE TO GET NEXT RECORD         00064000
         2. . IF RECORD IS FOUND THEN                      00064100
         3. . . SET APPROPRIATE BIT ON                     00064200
         2. . ENDIF RECORD FOUND                           00064300
         1. ENDIF FIRST CALL                               00064400
           END (GET A RECORD)                              00064500
*******************-END-PSEUDOCODE-*********************   00064600
     EJECT                                                 00064700
*********************************************************  00064800
           SORT - SORT ANOTHER RECORD                   *  00064900
*********************************************************  00065000
  FUNCTION: GIVEN A QUALIFIED RECORD, DETERMINE WHERE THE RECORD  * 00065100
            BELONGS IN THE BUCKET AND PUT THE RECORD HEADER IN    * 00065200
            THE BUCKET IF APPROPRIATE.                            * 00065300
     INPUT: RSOCNHDR, RSOCADDI                                    * 00065400
            DI - 0      SI - 0                                    * 00065500
            ES - FMCB   DS - SOCB                                 * 00065600
    OUTPUT: RSOCNCHD, RSOCADDI                                    * 00065700
                                                                  * 00065800
                                                                  * 00065900
                                                                  * 00066000
    NOTES:                                                        * 00066100
                                                                  * 00066200
```

TABLE I (cont.)

```
************************************************************   00066300
***************************-*PSEUDOCODE*-*******************   00066400
                BEGIN (SORT LOGIC)                             00066500
                1. SET INSERT FLAG OFF                         00066600
                1. SET UP DESTINATION HEADER                   00066700
                1. IF BUCKET NOT EMPTY THEN                    00066800
                2. . DO COMPARE RECORD TO WORST CASE           00066900
                2. . IF BETTER THAN WORST CASE THEN            00067000
                3. . . SET INSERTION FLAG ON                   00067100
                2. . ENDIF BETTER                              00067200
                2. . COMPUTE AVAILABLE SPACE                   00067300
                2. . IF RECORD HEADER WILL NOT FIT THEN        00067400
                3. . . SET ADD INHIBIT FLAG ON                 00067500
                3. . . IF INSERT FLAG ON THEN                  00067600
                4. . . . DO DELETE WORST CASE                  00067700
                3. . . ENDIF INSERT FLAG                       00067800
                2. . ENDIF RECORD FIT                          00067900
                2. . IF INSERT FLAG IS ON THEN                 00068000
                3. . . DO BINARY SEARCH TO FIND DESTINATION    00068100
                        POINT                                  00068200
                3. . . SHIFT HEADERS                           00068300
                3. . . SET DESTINATION FOR HEADER INSERT       00068400
                2. . ENDIF INSERT FLAG                         00068500
                1. ENDIF BUCKET EMPTY                          00068600
                1. IF INSERT FLAG IS ON OR IF ADD INHIBIT      00068700
                    IS OFF THEN                                00068800
                2. . DO PUT HEADER IN BUCKET                   00068900
                2. . UPDATE WORST CASE POINTER                 00069000
                2. . UPDATE BEGINING OF AVAILABLE SPACE        00069100
                1. ENDIF                                       00069200
                END (SORT LOGIC)                               00069300
*************************-END-PSEUDOCODE-*******************   00069400
        EJECT                                                  00069500
************************************************************   00069600

COPY - COPY FIELD VALUES FROM FM TO SORT BUCKET    *   00069700
************************************************************   00069800
    FUNCTION: MOVE RECORD VALUES FROM THE FILE MANAGER BUFFER TO *  00069900
            THE SORT BUCKET.                               *   00070000
                                                           *   00070100
    INPUT:                                                 *   00070200
                                                           *   00070300
                                                           *   00070400
    OUTPUT:                                                *   00070500
                                                           *   00070600
                                                           *   00070700
    NOTES:                                                 *   00070800
                                                           *   00070900
                                                           *   00071000
************************************************************   00071100
***************************-*PSEUDOCODE*-*******************   00071200
                BEGIN (COPY FIELD VALUES)                      00071300
                1. IF THERE ARE RECORDS TO COPY THEN           00071400
                2. . CHECK ROOM (ROOM NEEDED VS SPACE          00071500
                        AVAIABLE)                              00071600
                2. . IF NOT ENOUGH ROOM THEN                   00071700
                3. . . SET ADDITION INHIBIT FLAG ON            00071800
                3. . . UNTIL AVAILABLE SPACE GE NEEDED         00071900
```

TABLE I (cont.)

```
                    SPACE DO                          00072000
       4. . . . DO DELETE WORST CASE                  00072100
       4. . . . COMPUTE AVAILABLE SPACE               00072200
       3. . . ENDDO                                   00072300
       2. . ENDIF                                     00072400
       2. . CALCULATE STARTING POINT BASED ON         00072500
                    NEEDED SPACE                      00072600
       2. . WHILE THERE ARE RECORDS TO COPY DO        00072700
       3. . . IF DATA IS IN FM BUFFER THEN            00072800
       4. . . . MOVE ONE RECORD AT A TIME INTO        00072900
                    SORT BUCKET                       00073000
       4. . . . DECREMENT NUMBER OF COPIES            00073100
       4. . . . INDICATE DATA NOW IN SORT BUCKET      00073200
       4. . . . CALCULATE EBCDIC VALUES OF RECORD     00073300
                    ID'S                              00073400
       4. . . . INCREMENT TO PREVIOUS HEADER          00073500
       3. . . ELSE DATA IN SORT BUCKET MUST BE        00073600
                    MOVED                             00073700
       4. . . . GROUP DATA TO BE SHIFTED WITHIN       00073800
                    BUCKET                            00073900
       4. . . . SHIFT SORT BUCKET DATA                00074000
       3. . . ENDIF                                   00074100
       2. . ENDDO                                     00074200
       1. ENDIF NUMBER                                00074300
          END (COPY FIELD VALUES)                     00074400
          RESET NEEDED SPACE TO ZERO                  00074500
********************-END-PSEUDOCODE-***************** 00074600
    EJECT                                             00074700
****************************************************  00074800
          FMEOB - FILE MANAGER END OF BUFFER RETURN CODE * 00074900
****************************************************  00075000
  FUNCTION: POLL FOR END AND REQUEST KEY. IF NEITHER THEN CONTROL * 00075100
            COPYING RECORD VALUES INTO THE SORT BUCKET.   * 00075200
                                                      *   00075300
  INPUT:                                              *   00075400
                                                      *   00075500
                                                      *   00075600
  OUTPUT:                                             *   00075700
          RSOCERRF IS SET IF END RECEIVED (RSOCRCFL)  *   00075800
                                                      *   00075900
                                                      *   00076000
  NOTES:                                              *   00076100
                                                      *   00076200
                                                      *   00076300
****************************************************  00076400
***********************-*PSEUDOCODE*-**************** 00076500
                    BEGIN (FM EOB)                    00076600
       1. CALL RFOKBPOL TO POLL FOR END AND           00076700
                    REQUEST                           00076800
       1. IF NO ERRORS THEN                           00076900
       2. . IF END KEY NOT FOUND THEN                 00077000
       3. . . DO COPY FIELD VALUES                    00077100
       3. . . IF SORT IS FORCED AND IF ADDITION TO    00077200
                    BUCKET NOT ALLOWED AND IF BIT MAP 00077300
                    ESTABLISHED THEN                  00077400
       4. . . . TERMINATE SEARCH FOR MORE RECORDS     00077500
       3. . . ENDIF                                   00077600
       2. . ELSE END KEY                              00077700
```

TABLE I (cont.)

```
                  3. . . SET RETURN CODE TO GLOBAL END          00077800
                  3. . . INDICATE SORT ERROR                    00077900
                  2. . ENDIF                                    00078000
                  1. ELSE END KEY                               00078100
                  2. . SET ERROR FLAG ON                        00078200
                  1. ENDIF NO ERRORS                            00078300
                     END (FM EOB)                               00078400
**********************-END-PSEUDOCODE-*********************     00078500
     EJECT                                                      00078600
************************************************************   00078700
*            CALLQUAL - CALL QUALIFY TO GET NEXT RECORD       * 00078800
************************************************************   00078900
*  FUNCTION: CALL QUALIFY TO GET THE NEXT QUALIFIED RECORD. SET* 00079000
*            UP THE INTERFACE TO QUALIFY BASED ON IF ITS THE FIRST * 00079100
*            CALL OR IF NO SORTING IS REQUIRED.               * 00079200
*  INPUT:    RSOCGNQR                                         * 00079300
*                                                             * 00079400
*                                                             * 00079500
*  OUTPUT:   AX IS PASSED BACK IF ERROR FOUND                 * 00079600
*            RSOCGNQR                                         * 00079700
*                                                             * 00079800
*  NOTES:    THIS ROUTINE PASSES RSOCRCFL FROM LOWER ROUTINES TO * 00079900
*            CALLING ROUTINE.                                 * 00080000
*                                                             * 00080100
************************************************************   00080200
**********************-*PSEUDOCODE*-************************    00080300
                     BEGIN (QUALIFY INVOKE)                     00080400
                  1. IF FIRST CALL TO GNQR (RSOCGNQR OFF)       00080500
                     THEN                                       00080600
                  2. . SET GNQR INPUT TO NEXT                   00080700
                  2. . SET GNQR FLAG TO NEXT (RSOCGNQR ON)      00080800
                  1. ENDIF FIRST CALL TO GNQR                   00080900
                  1. PASS THE INPUT INDICATOR                   00081000
                  1. SET UP THE OUPUT BUFFER                    00081100
                  1. IF SORTING THEN                            00081200
                  2. . SET INPUT LIST TO COMPLETE               00081300
                  1. ELSE NOT SORTING                           00081400
                  2. . SET INPUT LIST TO CURRENT                00081500
                  1. ENDIF SORTING                              00081600
                  1. PASS NUMBER OF FIELDS                      00081700
                  1. INVOKE QUALIFY GET NEXT QUALIFIED RECORD   00081800
                     (RQLGNQR)                                  00081900
                  1. IF RETURN CODE NOT SUCCESS THEN            00082000
                  2. . DO RCAQLFM TO ANALYZE THE RETURN CODE    00082100
                  1. ENDIF RECORD NOT FOUND                     00082200
                     END (QUALIFY INVOKE)                       00082300
**********************-END-PSEUDOCODE-*********************     00082400
     EJECT                                                      00082500
************************************************************   00082600
*              TERM - TERMINATION PROCESSING                  * 00082700
************************************************************   00082800
*  FUNCTION: SET FLAGS BEFORE TERMINATING ALL SORTING.        * 00082900
*                                                             * 00083000
*                                                             * 00083100
*  INPUT:                                                     * 00083200
*                                                             * 00083300
*                                                             * 00083400
*  OUTPUT:   AX                                               * 00083500
```

TABLE I (cont.)

```
          RSOCTERM ON (RSOCRCFL)                                      *  00083600
                                                                      *  00083700
   NOTES:                                                             *  00083800
                                                                      *  00083900
                                                                      *  00084000
*****************************************************************************  00084100
************************-*PSEUDOCODE*-***************************************  00084200
                    BEGIN (TERMINATION)                                  00084300
                 1. SET TERMINATION FLAG ON                              00084400
                 1. SET RETURN CODE                                      00084500
                 1. SET REASON CODE                                      00084600
                    END (TERMINATION)                                    00084700
************************-END-PSEUDOCODE-*************************************  00084800
         EJECT                                                           00084900
*****************************************************************************  00085000
             RCAQLFM - RETURN CODE ANALYSIS FOR QUALIFY AND FM        *  00085100
*****************************************************************************  00085200
      FUNCTION: ANALYZE THE RETURN CODES FROM GETTING A RECORD -      *  00085300
                EITHER THE QUALIFY ROUTINE OR A FILE MANAGER ROUTINE. *  00085400
                                                                      *  00085500
      INPUT:    AX                                                    *  00085600
                                                                      *  00085700
                                                                      *  00085800
      OUTPUT:   RSOCRCFL IS SET ACCORDING TO THE RETURN CODE          *  00085900
                                                                      *  00086000
                                                                      *  00086100
      NOTES:                  RETURN CODE CHART                       *  00086200
                                                                      *  00086300
                 | SUCCESSFUL | EOB | EOF | ERROR | END |             *  00086400
                 ---------------------------------------              *  00086500
      RFMLUNQR  |      X     |  X  |     |   X   |     |             *  00086600
      RFMLNXTR  |      X     |  X  |  X  |   X   |     |             *  00086700
      RQLGNQR   |      X     |  X  |  X  |   X   |  X  |             *  00086800
                                                                      *  00086900
                 ---------------------------------------
*****************************************************************************  00087000
************************-*PSEUDOCODE*-***************************************  00087100
                    BEGIN (RCAQLFM)                                      00087200
                 1. IF RETURN CODE/REASON CODE IS EOB THEN               00087300
                 2. . SET EOB FLAG ON (RSOCEOBF)                         00087400
                 1. ELSE EOF, TERM, OR ERROR                             00087500
                 2. . IF RETURN CODE/ REASON CODE IS EOF                 00087600
                        THEN                                             00087700
                 3. . . IF NOT SORTING (RSOCNOST ON) OR IF               00087800
                        THE BUCKET IS EMPTY (RSOCNHDR                    00087900
                        ZERO) THEN                                       00088000
                 4. . . . DO TERMINATION                                 00088100
                 3. . . ELSE RECORDS IN BUCKET                           00088200
                 4. . . . SET EOF FLAG ON (RSOCEOFF)                     00088300
                 3. . . ENDIF RECORDS IN BUCKET                          00088400
                 2. . ELSE ERROR OR END                                  00088500
                 3. . . SET ERROR FLAG ON (RSOCERRF)                     00088600
                 2. . ENDIF EOF                                          00088700
                 1. ENDIF EOB                                            00088800
                    END (RCAQLFM)                                        00088900
************************-END-PSEUDOCODE-*************************************  00089000
         EJECT                                                           00089100
*****************************************************************************  00089200
             OVERFLOW - PROCESS THE OVERFLOW RECORDS                  *  00089300
*****************************************************************************  00089400
```

TABLE I (cont.)

```
FUNCTION: GET THE NEXT RECORD IN THE OVERFLOW PORTION OF RECORDS.*    00089500
          IF THE RECORD HAS ALREADY BEEN PASSED TO SORTS INVOKER,*    00089600
          THEN CONTINUE SEARCHING FOR A QUALIFIED RECORD.         *    00089700
INPUT:                                                            *    00089800
                                                                  *    00089900
                                                                  *    00090000
OUTPUT:                                                           *    00090100
                                                                  *    00090200
                                                                  *    00090300
NOTES:                                                            *    00090400
                                                                  *    00090500
                                                                  *    00090600
*****************************************************************   00090700
*************************-*PSEUDOCODE*-***************************   00090800
              BEGIN (OVERFLOW PASS)                                    00090900
           1. SET OVERFLOW COMPLETION FLAG OFF                         00091000
           1. WHILE OVERFLOW COMPLETION OFF AND NO                     00091100
              ERROR DO                                                 00091200
           2. . DO QUALIFY INVOKE TO GET NEXT RECORD                   00091300
           2. . IF RECORD FOUND THEN                                   00091400
           3. . . COMPARE RECORD TO WORST CASE PRINTED                 00091500
           3. . . IF PRESENT RECORD NOT PRINTED THEN                   00091600
           4. . . . SET OVERFLOW COMPLETION ON                         00091700
           4. . . . SET OVERFLOW CHECK ON                              00091800
           3. . . ENDIF                                                00091900
           2. . ENDIF                                                  00092000
           1. ENDDO                                                    00092100
              END (OVERFLOW PASS)                                      00092200
*************************-END-PSEUDOCODE-*************************   00092300
       EJECT                                                           00092400
*****************************************************************   00092500
              COMPARE - COMPARE TWO RECORDS                        *    00092600
*****************************************************************   00092700
   FUNCTION: COMPARE TWO RECORDS TO DETERMINE THEIR ORDERING IN THE *  00092800
             FILE.                                                 *    00092900
                                                                   *    00093000
   INPUT:  DS - SOCB SEGMENT                                       *    00093100
           ES - FMCB SEGMENT                                       *    00093200
           BX - OFFSET TO HEADER FOR RECORD A                      *    00093300
   OUTPUT: AH - 1 MEANS B WORSE THAN A                             *    00093400
                4 MEANS B BETTER THAN A                            *    00093500
                                                                   *    00093600
                                                                   *    00093700
   NOTES: TERMINOLOGY -                                            *
          RECORD A IS A RECORD IN THE SORT BUCKET. THIS            *    00093800
                   ALSO MEANS THAT IF A AND B ARE EQUAL THAT       *    00093900
                   A COMES BEFORE IN ORDER TO PRESERVE THE         *    00094000
                   ORDERING OF THE FILE - A WAS EARLIER IN         *    00094100
                   THE FILE THAN B.                                *    00094200
          RECORD B IS THE RECENTLY FOUND RECORD. IT IS NOT         *    00094300
                   NOT IN THE BUCKET. LLPP IS IN RSOCOVAL.         *    00094400
          LESS THAN MEANS THAT BASED ON THE SORT ORDER OF THE      *    00094500
                   FIELDS, A LT B MEANS A SHOULD BE IN THE         *    00094600
                   FILE BEFORE B.                                  *    00094700
          GREATER THAN  MEANS BASED ON THE SORT ORDER OF THE       *    00094800
                   FIELDS, A GT B MEANS A SHOULD BE IN THE         *    00094900
                   FILE AFTER B.                                   *    00095000
                                                                   *    00095100
          NOTE - AH AS OUTPUT SHOWS THE RELATIONSHIP OF B TO A,    *    00095200
```

TABLE I (cont.)

```
                    NOT A TO B AS USED IN THE COMPARISON ROUTINES.      *  00095300
                                                                        *  00095400
          NOTE - BX IS NOT CHANGED IN THIS SEGMENT.                     *  00095500
                                                                        *  00095600
*************************************************************************  00095700
*****************************-*PSEUDOCODE*-******************************  00095800
                    BEGIN (COMPARE RECORDS)                                00095900
                    1. UNTIL RECORDS NOT EQUAL OR ALL FIELDS               00096000
                          COMPARED DO                                      00096100
                    2. . IF FIELD TYPE IS CHARACTER THEN                   00096200
                    3. . . INVOKE CHARACTER COMPARE                        00096300
                    2. . ELSE ARITHMETIC                                   00096400
                    3. . . INVOKE ARITHMETIC COMPARE                       00096500
                    2. . ENDIF                                             00096600
                    2. . INCREMENT TO NEXT SORT FIELD                      00096700
                    1. ENDDO                                               00096800
                    1. IF UNEQUAL FIELDS THEN                              00096900
                    2. . IF ORDER OF UNEQUAL FIELDS IS                     00097000
                          ASCENDING THEN                                   00097100
                    3. . . REVERSE THE SENSE OF A AND B                    00097200
                    2. . ENDIF ORDER                                       00097300
                    1. ELSE EQUAL                                          00097400
                    2. . SET B TO WORSE THAN A                             00097500
                    1. ENDIF UNEQUAL                                       00097600
                    END (COMPARE RECORDS)                                  00097700
****************************-END-PSEUDOCODE-****************************  00097800
     EJECT                                                                 00097900
*************************************************************************  00098000
             HEADER - PUT A HEADER IN BUCKET                            *  00098100
*************************************************************************  00098200
     FUNCTION: FORM A HEADER AT THE DESIRED LOCATION IN THE SORT        *  00098300
               BUCKET.                                                  *  00098400
                                                                        *  00098500
     INPUT: DS - SOCB SEGMENT                                           *  00098600
            ES - FMCB SEGMENT                                           *  00098700
            DI - DESTINATION FOR HEADER ADDITION/INSERTION              *  00098800
     OUTPUT:                                                            *  00098900
                                                                        *  00099000
                                                                        *  00099100
     NOTES: SPACE FOR HEADER ALREADY PROVIDED                           *  00099200
                                                                        *  00099300
                                                                        *  00099400
*************************************************************************  00099500
*****************************-*PSEUDOCODE*-******************************  00099600
                    BEGIN (PUT HEADER IN BUCKET)                           00099700
                    1. FORM HEADER IN BUCKET AT DESTINATION                00099800
                    1. TOTAL LL'S                                          00099900
                    1. PUT TOTAL IN HEADER                                 00100000
                    1. UPDATE NEEDED SPACE FOR DATA (SUM = SUM             00100100
                       + TOTAL LL'S)                                       00100200
                    1. INCREMENT NUMBER OF HEADERS IN SORT                 00100300
                       BUCKET                                              00100400
                    1. INCREMENT NUMBER OF RECORDS TO COPY                 00100500
                    END (PUT HEADER IN BUCKET)                             00100600
****************************-END-PSEUDOCODE-****************************  00100700
     EJECT                                                                 00100800
```

TABLE I (cont.)

```
****************************************************************  00100900
                DELETE - DELETE THE WORST CASE               *    00101000
****************************************************************  00101100
    FUNCTION: DELETE THE WORST CASE FROM THE SORT BUCKET.    *    00101200
                                                             *    00101300
                                                             *    00101400
    INPUT:    RSOCWCHD                                       *    00101500
                                                             *    00101600
                                                             *    00101700
    OUTPUT:   RSOCBEGA, RSOCENDA, RSOCHDSZ, RSOCNHDR, RSOCNCPY, *  00101800
              RSOCNEED                                       *    00101900
                                                             *    00102000
    NOTES:                                                   *    00102100
                                                             *    00102200
                                                             *    00102300
****************************************************************  00102400
************************-*PSEUDOCODE*-**************************  00102500
                    BEGIN (DELETE WORST CASE)                     00102600
                    1. IF WORST CASE DATA IN SORT BUCKET THEN     00102700
                    2. . DELETE DATA BY MOVING POINTER            00102800
                            (RSOCENDA)                            00102900
                    1. ELSE                                       00103000
                    2. . UPDATE NEEDED SPACE (SUM = SUM - TOTAL   00103100
                            LL'S)                                 00103200
                    2. . DECREMENT NUMBER OF HEADERS TO COPY      00103300
                    1. ENDIF WORST CASE                           00103400
                    1. DELETE WORST CASE HEADER BY UPDATING       00103500
                            POINTER (RSOCBEGA)                    00103600
                    1. DECREMENT NUMBER OF HEADERS (RSOCNHDR)     00103700
                    1. SET WORST CASE POINTER TO PREVIOUS         00103800
                            RECORD                                00103900
                    END (DELETE WORST CASE)                       00104000
************************-END-PSEUDOCODE-************************  00104100
        EJECT                                                     00104200
****************************************************************  00104300
                BINARY - BINARY SEARCH                       *    00104400
****************************************************************  00104500
    FUNCTION: PERFORM A BINARY SEARCH OF THE RECORD HEADERS TO *  00104600
              DETERMINE WHERE THE RECORD IN QUESTION IS TO BE *   00104700
              PLACED. RETURN THE DESTINATION AS THE POINT WHERE THE * 00104800
              NEW HEADER IS TO BE PLACED. ALL RECORDS AFTER THIS * 00104900
              POINT ARE WORSE THAN THE CURRENT RECORD.        *   00105000
    INPUT:    DS - SOCB SEGMENT                              *    00105100
                                                             *    00105200
                                                             *    00105300
    OUTPUT:   BX - OFFSET TO INSERTION POINT                 *    00105400
                                                             *    00105500
                                                             *    00105600
    NOTES:    FOR BINARY SEARCH HANDLING, HEADERS ARE COUNTED FROM * 00105700
              ORIGIN 1. FOR COMPUTING OFFSETS TO HEADERS, HEADERS * 00105800
              MUST BE FORM ORIGIN 0.                         *    00105900
                                                             *    00106000
****************************************************************  00106100
************************-*PSEUDOCODE*-**************************  00106200
                    BEGIN (BINARY SEARCH)                         00106300
                    1. SET LOW = 1                                00106400
                    1. SET HIGH = NUMBER OF HEADERS IN BUCKET     00106500
```

TABLE I (cont.)

```
1. WHILE LOW LE HIGH DO                              00106600
2. . CURRENT = INTEGER OF (LOW + HIGH)/2             00106700
2. . COMPARE RECORD A TO RECORD(CURRENT)             00106800
2. . IF A LT B THEN                                  00106900
3. . . SET DIRECTION BIT OFF                         00107000
3. . . SET HIGH = CURRENT-1                          00107100
2. . ELSE A GT B                                     00107200
3. . . SET DIRECTION BIT ON                          00107300
3. . . LOW = CURRENT+1                               00107400
2. . ENDIF A LT B                                    00107500
1. ENDDO LOW LE HIGH                                 00107600
1. IF DIRECTION BIT OFF THEN                         00107700
2. . CURRENT = CURRENT-1                             00107800
1. ENDIF DIRECTION BIT                               00107900
1. OFFSET OF INSERTION POINT = CURRENT *             00108000
       HEADER SIZE                                   00108100
   END (BINARY SEARCH)                               00108200
*********************-END-PSEUDOCODE-*********************  00108300
   END   RSOGNSOR                                    00108400
```

While only one embodiment of the invention, together with modifications thereof, has been described in detail herein and shown in the accompanying drawings, it will be evident that various further modifications are possible without departing from the scope of the invention.

We claim:

1. A method of presorting file records in a storage means for temporary retention in a sort buffer in an order based on selected ranking, comprising the steps of:

(a) accessing each of said file records in said storage means;
   (b) determining whether an accessed file record qualifies for transfer to the sort buffer;
   (c) if said accessed file record qualifies, setting a record identifying bit from a first state to a second state;
   (d) comparing the rank of the qualified file record data in the storage means with the rank of the lowest ranked file record in the sort buffer;
   (e) if the rank of the qualified file record is higher than the rank of the lowest ranked file record, transferring the qualified file record in the storage means to unused space in the sort buffer;
   (f) locating the qualified file record transferred to the sort buffer at a level based on said rank thereof; and
   (g) resetting the record identifying bit to the first state for the qualified file record now located in the sort buffer.

2. A method of presorting file records as set forth in claim 1 including the step of repeating steps (d)-(g) for each qualified file record with a record identifying bit in the second state.

3. A method of presorting file records as set forth in claim 1 including the step of outputting the file records in the sort buffer after steps (d)-(f) have been repeated for each file record in the storage means having a record identifying bit in the second state.

4. A method of presorting file records in a storage means for temporary retention in a sort buffer in an order based on a selected ranking, comprising the steps of:

(a) accessing each of said file records in said storage means;
   (b) determining whether an accessed file record qualifies for transfer to the sort buffer;
   (c) setting a preselected number of record identifying bits from a first state to a second state for each of a like number of qualified file records in the storage means;
   (d) setting an overflow record identifying bit from a first state to a second state for all remaining qualified file records in the storage means;
   (e) comparing the rank of a qualified file record in the storage means with the rank of the lowest ranked file record in the sort buffer;
   (f) if the rank of the qualified field record is higher than the rank of the lowest ranked file record, transferring the qualified file record in the storage means to unused space in the sort buffer;
   (g) locating the qualified file record transferred to the sort buffer at a level based on said rank thereof;
   (h) resetting the record identifying bit to the first state for said qualified file record now located in the sort buffer; and
   (i) sorting each file record associated with the overflow record identifying bit.

5. A method of presorting file records as set forth in claim 4 including the step of repeating steps (e)-(i) for each qualified file record in the storage means with a record identifying bit in the second state.

6. A method of presorting file records as set forth in claim 5 wherein steps (e)-(i) are repeated until all the record identifying bits are reset to the first state.

7. A method of presorting file records as set forth in claim 6 including the step of outputting the file records in the sort buffer after steps (e)-(g) have been repeated to transfer the highest ranked file records in the storage means to the sort buffer.

8. A method for presorting file records in a storage means for temporary retention in a sort buffer in an order based on a selected ranking, comprising the steps of:

(a) accessing each of said file records in said storage means;
   (b) determining whether an accessed file record qualifies for transfer to the sort buffer;

(c) if said accessed file record qualifies, setting a record identifying bit from a first state to a second state;

(d) comparing the rank of a qualified file record in the storage means with the rank of the lowest file record in the sort buffer;

(e) if the rank of the qualified file record is higher than the rank of the lowest file record, determining whether there is enough space in said sort buffer for the qualified file record;

(f) if there is enough space in said sort buffer for said qualified file record, locating the qualified file record transferred to the sort buffer at a level based on said rank;

(g) resetting the record identifying bit to the first state for said qualified file record now located in the sort buffer; and (h) repeating steps (d)-(g) for each qualified file record with a record identifying bit in the second state.

9. A method of presorting file records as set forth in claim 8 wherein if there is not enough space in the sort buffer, said lowest file record is deleted from said sort buffer.

* * * * *